United States Patent
Dong

(10) Patent No.: US 10,757,692 B2
(45) Date of Patent: Aug. 25, 2020

(54) METHOD FOR DETERMINING NETWORK STANDARD IN WIRELESS COMMUNICATIONS NETWORK, ACCESS POINT DEVICE, TERMINAL DEVICE, AND RADIO NETWORK CONTROLLER

(71) Applicant: HUAWEI TECHNOLOGIES CO., LTD., Shenzhen, Guangdong (CN)

(72) Inventor: Mingjie Dong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/015,780

(22) Filed: Jun. 22, 2018

(65) Prior Publication Data

US 2018/0302884 A1    Oct. 18, 2018

Related U.S. Application Data

(63) Continuation of application No. PCT/CN2015/098778, filed on Dec. 24, 2015.

(51) Int. Cl.
*H04W 72/04* (2009.01)
*H04W 48/08* (2009.01)
*H04W 88/10* (2009.01)

(52) U.S. Cl.
CPC ......... *H04W 72/042* (2013.01); *H04W 48/08* (2013.01); *H04W 72/048* (2013.01); *H04W 88/10* (2013.01)

(58) Field of Classification Search
CPC . H04W 72/042; H04W 72/048; H04W 48/08; H04W 88/10
See application file for complete search history.

(56) References Cited

U.S. PATENT DOCUMENTS

2005/0197135 A1* 9/2005 Nelson .................. H04W 88/10
455/453
2007/0049278 A1* 3/2007 Lindoff ............. H04W 36/0055
455/439

(Continued)

FOREIGN PATENT DOCUMENTS

CN    101137243 A    3/2008
CN    101203016 A    6/2008

(Continued)

OTHER PUBLICATIONS

Extended European Search Report, dated Oct. 15, 2018, in European Application No. 15911151.7 (10 pp.).

(Continued)

*Primary Examiner* — Christine Ng
(74) *Attorney, Agent, or Firm* — Conley Rose, P.C.

(57) ABSTRACT

The method includes: receiving, by an access point device, at least one network standard configuration request message sent by at least one terminal device, where the at least one network standard configuration request message indicates a network standard that needs to be used by the at least one terminal device; determining, by the access point device according to the network standard configuration request message sent by the at least one terminal device, a same network standard that needs to be used by all or some of the at least one terminal device, as a target network standard; and sending, by the access point device, a network standard trigger message to the all or some of the at least one terminal device, where the network standard trigger message indicates the target network standard configured by the access point device.

20 Claims, 7 Drawing Sheets

(56) References Cited

U.S. PATENT DOCUMENTS

| | | |
|---|---|---|
| 2009/0227262 A1 | 9/2009 | Gao |
| 2010/0226297 A1 | 9/2010 | Kasslin et al. |
| 2011/0053599 A1* | 3/2011 | Hsu .................. H04W 36/08 455/436 |
| 2011/0254697 A1* | 10/2011 | Casey .................. G01D 4/002 340/870.02 |
| 2012/0044824 A1 | 2/2012 | Osterling et al. |
| 2013/0009787 A1* | 1/2013 | Ree .................. G01D 4/002 340/870.02 |
| 2014/0080467 A1 | 3/2014 | Urbanek |
| 2014/0157138 A1 | 6/2014 | Kuscher et al. |
| 2015/0094011 A1 | 4/2015 | Haessler et al. |
| 2015/0264632 A1 | 9/2015 | Zhi et al. |
| 2015/0373670 A1 | 12/2015 | Fang et al. |
| 2016/0044588 A1 | 2/2016 | Li et al. |
| 2017/0041158 A1* | 2/2017 | Morioka .............. H04W 88/06 |

FOREIGN PATENT DOCUMENTS

| | | |
|---|---|---|
| CN | 102405672 A | 4/2012 |
| CN | 102625417 A | 8/2012 |
| CN | 102711275 A | 10/2012 |
| CN | 103648134 A | 3/2014 |
| CN | 104125622 A | 10/2014 |
| EP | 2094024 B1 | 8/2009 |
| EP | 2094024 B1 | 11/2014 |
| EP | 2947921 A1 | 11/2015 |
| WO | 2010123417 A1 | 10/2010 |
| WO | 2014131176 A1 | 9/2014 |

OTHER PUBLICATIONS

International Search Report dated Sep. 23, 2016, in corresponding International Patent Application No. PCT/CN2015/098778, 7 pgs.
Written Opinion of the International Search Authority dated Sep. 23, 2016 in corresponding International Patent Application No. PCT/CN2015/098778, 5 pgs.
International Search Report dated Sep. 23, 2016 in corresponding International Patent Application No. PCT/CN2015/098778.
Machine Translation and Abstract of Chinese Publication No. CN101137243, Mar. 5, 2008, 14 pages.
Foreign Communication From a Counterpart Application, Chinese Application No. 201580044965.3, Chinese Search Report dated Jun. 5, 2019, 8 pages.
Machine Translation and Abstract of Chinese Publication No. CN101137243, dated Mar. 5, 2008, 14 pages.
Foreign Communication From a Counterpart Application, Chinese Application No. 201580044965.3, Chinese Office Action dated Jun. 5, 2019, 8 pages.
Foreign Communication From a Counterpart Application, Chinese Application No. 201580044965.3, Chinese Search Report dated Jun. 23, 2019, 3 pages.

* cited by examiner

METHOD FOR DETERMINING NETWORK STANDARD IN WIRELESS COMMUNICATIONS NETWORK, ACCESS POINT DEVICE, TERMINAL DEVICE, AND RADIO NETWORK CONTROLLER

CROSS-REFERENCE TO RELATED APPLICATIONS

This application is a continuation of International Application No. PCT/CN2015/098778, filed on Dec. 24, 2015. the disclosure of which is hereby incorporated by reference in its entirety.

TECHNICAL FIELD

The present invention relates to the field of wireless communications, and more specifically, to a method for determining a network standard in a wireless communications network, an access point device, a terminal device, and a radio network controller.

BACKGROUND

In a current wireless communications network, a network standard of an access point lacks flexibility, causing a waste of resources and low resource utilization. For example, an operator configures a 4G network standard as a network standard of a base station. After a terminal device accesses the base station by using the 4G network standard, if a requirement of the terminal device can be satisfied by using a 2G network standard, a waste of resources is caused when the base station still provides the 4G network standard for the terminal device. Consequently, resource utilization is low.

SUMMARY

The present invention provides a method for determining a network standard in a wireless communications network, an access point device, a terminal device, and a radio network controller, to flexibly configure a network standard for an access point according to a requirement of a terminal device on the network standard, thereby saving resources and improving resource utilization.

According to a first aspect, the present invention provides a method for determining a network standard in a wireless communications network, including: receiving, by an access point device, at least one network standard configuration request message sent by at least one terminal device, where the at least one network standard configuration request message indicates a network standard that needs to be used by the at least one terminal device; determining, by the access point device according to the network standard configuration request message sent by the at least one terminal device, a same network standard that needs to be used by all or some of the at least one terminal device, as a target network standard; and sending, by the access point device, a network standard trigger message to the all or some of the at least one terminal device, where the network standard trigger message indicates that the target network standard has already been configured by the access point device.

According to the method for determining a network standard in a wireless communications network in the present invention, the access point device receives the network standard configuration request message sent by the terminal device, then determines, according to the network standard configuration request message, a network standard to be configured, and sends the network standard trigger message to the terminal device, to inform the terminal device that the target network standard has already been configured by the access point device, so that the access point device can flexibly configure a network standard according to a requirement of a terminal device, thereby saving resources and improving resource utilization.

With reference to the first aspect, in a first possible implementation, the determining, by the access point device according to the network standard configuration request message sent by the at least one terminal device, a same network standard that needs to be used by all or some of the at least one terminal device, as a target network standard includes: when a proportion of the all or some of the at least one terminal device that need to use the same network standard to all terminal devices accessing the access point device exceeds a first threshold, determining, by the access point device, the same network standard as the target network standard according to the network standard configuration request message sent by the at least one terminal device.

With reference to the first aspect, in a second possible implementation, the determining, by the access point device according to the network standard configuration request message sent by the at least one terminal device, a same network standard that needs to be used by all or some of the at least one terminal device, as a target network standard includes: determining, by the access point device according to the network standard configuration request message sent by the at least one terminal device, a network standard that needs to be used by a first terminal device in the at least one terminal device, as the target network standard, where the first terminal device is a terminal device whose priority is highest among terminal devices accessing the access point device.

With reference to any one of the first aspect, or the first or the second possible implementation, in a third possible implementation, the method further includes: sending, by the access point device, the network standard trigger message to another terminal device that does not request to use a first network standard among the terminal devices accessing the access point device, where the network standard trigger message indicates that the target network standard has already been configured by the access point device.

With reference to any one of the first aspect, or the first to the third possible implementations, in a fourth possible implementation, the method further includes: sending, by the access point device, a configuration file request message to a radio network controller; receiving, by the access point device, a configuration file that is sent according to the configuration file request message by the radio network controller for configuring the target network standard; and configuring, by the access point device, the target network standard according to the configuration file.

With reference to the first aspect, in a fifth possible implementation, the determining, by the access point device according to the network standard configuration request message sent by the at least one terminal device, a same network standard that needs to be used by all or some of the at least one terminal device, as a target network standard includes: sending, by the access point device, a decision request message to a radio network controller, where the decision request message is used to indicate, to the radio network controller, the network standard that needs to be used by the at least one terminal device; receiving, by the access point device, a decision response message sent by the radio network controller, where the decision response message is used to indicate the target network standard, and the target network standard is a network standard that is determined by the radio network controller according to the decision response message and information about the access point device controlled by the radio network controller; and determining, by the access point device, the target network standard according to the decision response message.

According to the method for determining a network standard in a wireless communications network in this embodiment of the present invention, the terminal device sends the network standard that needs to be used to the access point device by using the network standard configuration request message. The access point device sends information about the network standard that needs to be used by the terminal device to the radio network controller. The radio network controller determines the network standard that needs to be configured by the access point device. Therefore, resource utilization can be improved and resources of the access point device can be saved.

With reference to the fifth possible implementation, in a sixth possible implementation, the decision response message is further used to instruct the access point device to instruct another terminal device that does not request to use the target network standard among terminal devices accessing the access point device to access another access point device. The method further includes: sending, by the access point device, the network standard trigger message to the another terminal device according to the decision response message, where the network standard trigger message is used to instruct the another terminal device to access the another access point device.

According to the method for determining a network standard in a wireless communications network in this embodiment of the present invention, the access point device sends information about the network standard that needs to be used by the terminal device to the radio network controller, and the radio network controller determines, with reference to information about the another access point device, the network standard that needs to configured by the access point device, so that each terminal device can use a network standard satisfying its requirement, thereby further improving resource utilization.

With reference to the fifth or the sixth possible implementation, in a seventh possible implementation, the method further includes: receiving, by the access point device, a configuration file that is sent by the radio network controller for configuring the target network standard.

According to a second aspect, the present invention provides a method for determining a network standard in a wireless communications network, including: determining, by a terminal device, a network standard that needs to be used; sending, by the terminal device, a network standard configuration request message to an access point device, where the network standard configuration request message indicates, the network standard that needs to be used by the terminal device; receiving, by the terminal device, a network standard trigger message sent by the access point device; and determining, by the terminal device according to the network standard trigger message, a network standard that has been configured by the access point device.

According to the method for determining a network standard in this embodiment of the present invention, the terminal device sends information about the network standard that needs to be used to the access point device. The access point device determines a new network standard that needs to be configured. Then, the terminal device receives a notification message sent by the access point device, and determines, according to the notification message, the network standard configured by the access point device, so that the terminal device can use the network standard satisfying its requirement, thereby improving resource utilization.

With reference to the second aspect, in a first possible implementation, the determining, by a terminal device, a network standard that needs to be used includes: determining, by the terminal device, that the network standard that needs to be used is a network standard entered by a user; or determining, by the terminal device according to at least one type of status information of status information of the terminal device or status information of the wireless communications network that is collected by the terminal device, the network standard needed by the terminal device.

According to a third aspect, the present invention provides a method for determining a network standard in a wireless communications network, including: receiving, by a radio network controller, a decision request message sent by an access point device, where the decision request message is used to indicate, a network standard that at least one terminal device accessing the access point device requests to use; determining, by the radio network controller according to the decision request message, a same network standard that all or some of the at least one terminal device request to use, as a target network standard of the access point device; and sending, by the radio network controller, a decision response message to the access point device, where the decision response message is used to indicate the target network standard.

According to the method for determining a network standard in this embodiment of the present invention, the radio network controller receives information, about the network standard that needs to be used by the terminal device, sent by the access point device, and the radio network controller determines, according to information about the terminal device, the network standard that needs to be configured by the access point device, so that each terminal device can use a network standard satisfying its requirement, thereby improving resource utilization.

With reference to the third aspect, in a first possible implementation, the determining, by the radio network controller according to the decision request message, a same network standard that all or some of the at least one terminal device request to use, as a target network standard includes: determining, by the radio network controller according to the decision request message and information about the access point device controlled by the wireless communications network, the same network standard that the all or some of the at least one terminal device request to use, as the target network standard, where the decision response message is further used to instruct the access point device to instruct another device among terminal devices accessing the access point device except the all or some of the at least one terminal device to access another access point device.

According to the method for determining a network standard in this embodiment of the present invention, the radio network controller receives information, about the network standard that needs to be used by the terminal device, sent by the access point device and received from the terminal device, and the radio network controller determines, according to information about the terminal device with reference to information about the another access point device, the network standard that needs to be configured by the access point device, so that each terminal device can use a network standard satisfying its requirement, thereby improving resource utilization.

With reference to the third aspect or the first possible implementation, in a second possible implementation, the method further includes: sending, by the radio network controller, a configuration file for configuring the target network standard to the access point device.

When the radio network controller sends the configuration file for configuring the target network standard to the access point device, the configuration file may be sent by using the decision response message, or may be sent by using another packet or message.

It should be understood that, the configuration file for configuring the target network standard may also be stored on the access point device. In this case, the radio network controller does not need to send the configuration file to the access point device.

According to a fourth aspect, the present invention provides an access point device in a wireless communications network, including: a receiving unit, configured to receive at least one network standard configuration request message sent by at least one terminal device, where the at least one network standard configuration request message indicates a network standard that needs to be used by the at least one terminal device; a determining unit, configured to determine, according to the at least one network standard configuration request message, a same network standard that needs to be used by all or some of the at least one terminal device, as a target network standard; and a sending unit, configured to send a network standard trigger message to the all or some of the at least one terminal device, where the network standard trigger message indicates that the target network standard has already been configured by the access point device.

With reference to the fourth aspect, in a first possible implementation, the determining unit is specifically configured to: when a proportion of the all or some of the at least one terminal device that need to use the same network standard to all terminal devices accessing the access point device exceeds a first threshold, determine the same network standard as the target network standard according to the network standard configuration request message sent by the at least one terminal device.

With reference to the fourth aspect, in a second possible implementation, the determining unit is specifically configured to determine, according to the network standard configuration request message sent by the at least one terminal device, a network standard that needs to be used by a first terminal device in the at least one terminal device, as the target network standard, where the first terminal device is a terminal device whose priority is highest among terminal devices accessing the access point device.

With reference to the fourth aspect, or the first or the second possible implementation, in a third possible implementation, the sending unit is further configured to send the network standard trigger message to another terminal device that does not need to use a first network standard among the terminal devices accessing the access point device, where the network standard trigger message indicates that the target network standard has already been configured by the access point device.

With reference to any one of the fourth aspect or the first to the third possible implementations of the fourth aspect, in a fourth possible implementation, the sending unit is further configured to send a configuration file request message to a radio network controller, and the receiving unit is further configured to receive a configuration file that is sent according to the configuration file request message by the radio network controller for configuring the target network standard; and the access point device further includes a configuration unit, configured to configure the target network standard according to the configuration file.

With reference to the fourth aspect, in a fifth possible implementation, the sending unit is further configured to send a decision request message to a radio network controller, where the decision request message is used to indicate, to the radio network controller, the network standard that needs to be used by the at least one terminal device and a network standard that is currently used by a terminal device among terminal devices accessing the access point device except the at least one terminal device; the receiving unit is further configured to receive a decision response message sent by the radio network controller, where the decision response message is used to indicate the target network standard, and the target network standard is a network standard that is determined by the radio network controller according to the decision response message and information about the access point device controlled by the radio network controller; and the determining unit is specifically configured to determine the target network standard according to the decision response message.

With reference to the fifth possible implementation, in a sixth possible implementation, the decision response message is further used to instruct the access point device to instruct another terminal device among the terminal devices accessing the access point device except the all or some of the at least one terminal device to access another access point device, and the sending unit is further configured to send a network standard trigger message to the another terminal device according to the decision response message, where the network standard trigger message is used to instruct the another terminal device to access the another access point device.

With reference to the fifth or the sixth possible implementation, in a seventh possible implementation, the receiving unit is further configured to receive a configuration file that is sent by the radio network controller for configuring the target network standard.

The access point device in a wireless communications network of the present invention receives the network standard configuration request message sent by the terminal device, then determines, according to the network standard configuration request message, a network standard to be configured, and sends the network standard trigger message to the terminal device, to inform the terminal device that the target network standard has already been configured by the access point device, so that the access point device can flexibly configure a network standard according to a requirement of a terminal device, thereby saving resources and improving resource utilization.

According to a fifth aspect, the present invention provides a terminal device in a wireless communications network, including: a determining unit, configured to determine a network standard that needs to be used by the terminal device; a sending unit, configured to send a network standard configuration request message to an access point device, where the network standard configuration request message indicates, to the access point device, the network standard that needs to be used by the terminal device; a receiving unit, configured to receive a network standard trigger message sent by the access point device, where determining unit is configured to determine, according to the network standard trigger message, the network standard configured by the access point device.

With reference to the fifth aspect, in a first possible implementation, the determining unit is specifically configured to determine that the network standard that needs to be used is a network standard entered by a user; or the determining unit is specifically configured to determine, according to at least one type of status information of status information of the terminal device or status information of the wireless communications network that is collected by the terminal device, the network standard needed by the terminal device.

The terminal device in this embodiment of the present invention sends information about the network standard that needs to be used to the access point device. The access point device determines a new network standard that needs to be configured. Then, the terminal device receives a notification message sent by the access point device, and determines, according to the notification message, the network standard configured by the access point device, so that the terminal device can use the network standard satisfying its requirement, thereby improving resource utilization.

According to a sixth aspect, the present invention provides a radio network controller in a wireless communications network, including: a receiving unit, configured to receive a decision request message sent by an access point device, where the decision request message is used to indicate, a network standard that at least one terminal device accessing the access point device requests to use; a determining unit, configured to determine, according to the decision request message, a same network standard that all or some of the at least one terminal device request to use, as a target network standard of the access point device; and a sending unit, configured to send a decision response message to the access point device, where the decision response message is used to indicate the target network standard.

With reference to the sixth aspect, in a first possible implementation, the determining unit is specifically configured to determine, according to the decision request message and information about the access point device controlled by the wireless communications network, the same network standard that the all or some of the at least one terminal device request to use, as the target network standard, where the decision response message is further used to instruct the access point device to instruct another device among terminal devices accessing the access point device except the all or some of the at least one terminal device to access another access point device.

With reference to the sixth aspect or the first possible implementation, in a second possible implementation, the sending unit is further configured to send a configuration file for configuring the target network standard to the access point device.

The radio network controller in this embodiment of the present invention receives information, about the network standard that needs to be used by the terminal device, sent by the access point device, and the radio network controller determines, according to information about the terminal device, that configuration needs to be performed by the access point device, so that each terminal device can use a network standard satisfying its requirement, thereby improving resource utilization.

According to a seventh aspect, the present invention provides an access point device in a wireless communications network. The access point device includes: a receiver, a transmitter, a storage, a processor, and a bus system. The receiver, the transmitter, the storage, and the processor are connected by using the bus system. The storage is configured to store an instruction. The receiver and the transmitter are respectively configured to receive and send a message. The processor is configured to: execute the instruction stored in the storage, and when the processor executes the instruction stored in the storage, the execution causes the processor to invoke the receiver and the transmitter to perform the method according to the first aspect or any possible implementation of the first aspect.

The access point device in a wireless communications network of the present invention receives a network standard configuration request message sent by a terminal device, then determines, according to the network standard configuration request message, a network standard to be configured, and sends a network standard trigger message to the terminal device, to inform the terminal device that a target network standard has already been configured by the access point device, so that the access point device can flexibly configure a network standard according to a requirement of a terminal device, thereby saving resources and improving resource utilization.

According to an eighth aspect, the present invention provides a terminal device in a wireless communications network. The terminal device includes: a receiver, a transmitter, a storage, a processor, and a bus system. The receiver, the transmitter, the storage, and the processor are connected by using the bus system. The storage is configured to store an instruction. The receiver and the transmitter are respectively configured to receive and send a message. The processor is configured to: execute the instruction stored in the storage, and when the processor executes the instruction stored in the storage, the execution causes the processor to invoke the receiver and the transmitter to perform the method according to the second aspect or any possible implementation of the second aspect.

The terminal device in this embodiment of the present invention sends information about a network standard that needs to be used to an access point device. The access point device determines a new network standard that needs to be configured. Then, the terminal device receives a notification message sent by the access point device, and determines, according to the notification message, the network standard configured by the access point device, so that the terminal device can use the network standard satisfying its requirement, thereby improving resource utilization.

According to a ninth aspect, the present invention provides a radio network controller in a wireless communications network. The radio network controller includes: a receiver, a transmitter, a storage, a processor, and a bus system. The receiver, the transmitter, the storage, and the processor are connected by using the bus system. The storage is configured to store an instruction. The receiver and the transmitter are respectively configured to receive and send a message. The processor is configured to: execute the instruction stored in the storage, and when the processor executes the instruction stored in the storage, the execution causes the processor to invoke the receiver and the transmitter to perform the method according to the third aspect or any possible implementation of the third aspect.

The radio network controller in this embodiment of the present invention receives information, about a network standard that needs to be used by a terminal device, sent by an access point device, and the radio network controller determines, according to information about the terminal device, that configuration needs to be performed by the access point device, so that each terminal device can use a network standard satisfying its requirement, thereby improving resource utilization.

According to a tenth aspect, the present invention provides a wireless communications system in a wireless communications network. The wireless communications system includes the access point device according to the fourth aspect or any possible implementation of the fourth aspect and the radio network controller according to the sixth aspect or any possible implementation of the sixth aspect.

After receiving a network standard configuration request message sent by a terminal device, the access point device in the wireless communications system of the present invention cooperates with the radio network controller, determines, according to the network standard configuration request message, a network standard to be configured, and sends a network standard trigger message to the terminal device, to inform the terminal device that a target network standard has already been configured by the access point device, so that the access point device can flexibly configure a network standard according to a requirement of a terminal device, thereby saving resources and improving resource utilization.

According to an eleventh aspect, the present invention provides a wireless communications system in a wireless communications network. The wireless communications system includes the access point device according to the fourth aspect or any possible implementation of the fourth aspect, the terminal device according to the fifth aspect or any possible implementation of the fifth aspect, and the radio network controller according to the sixth aspect or any possible implementation of the sixth aspect.

The terminal device in the wireless communications system of the present invention sends a network standard that needs to be used by the terminal device to the access device. After receiving a network standard configuration request message sent by the terminal device, the access point device cooperates with the radio network controller, determines, according to the network standard configuration request message, a network standard to be configured, and sends a network standard trigger message to the terminal device, to inform the terminal device that a target network standard has already been configured by the access point device, so that the access point device can flexibly configure a network standard according to a requirement of a terminal device, thereby saving resources and improving resource utilization.

According to a twelfth aspect, the present invention provides a wireless communications system in a wireless communications network. The wireless communications system includes the access point device according to the seventh aspect or any possible implementation of the seventh aspect and the radio network controller according to the ninth aspect or any possible implementation of the ninth aspect.

After receiving a network standard configuration request message sent by a terminal device, the access point device in the wireless communications system of the present invention cooperates with the radio network controller, determines, according to the network standard configuration request message, a network standard to be configured, and sends a network standard trigger message to the terminal device, to inform the terminal device that a target network standard has already been configured by the access point device, so that the access point device can flexibly configure a network standard according to a requirement of a terminal device, thereby saving resources and improving resource utilization.

According to a thirteenth aspect, the present invention provides a wireless communications system in a wireless communications network. The wireless communications system includes the access point device according to the seventh aspect or any possible implementation of the seventh aspect, the terminal device according to the eighth aspect or any possible implementation of the eighth aspect, and the radio network controller according to the ninth aspect or any possible implementation of the ninth aspect.

The terminal device in the wireless communications system of the present invention sends a network standard that needs to be used by the terminal device to the access device. After receiving a network standard configuration request message sent by the terminal device, the access point device cooperates with the radio network controller, determines, according to the network standard configuration request message, a network standard to be configured, and sends a network standard trigger message to the terminal device, to inform the terminal device that a target network standard has already been configured by the access point device, so that the access point device can flexibly configure a network standard according to a requirement of a terminal device, thereby saving resources and improving resource utilization.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
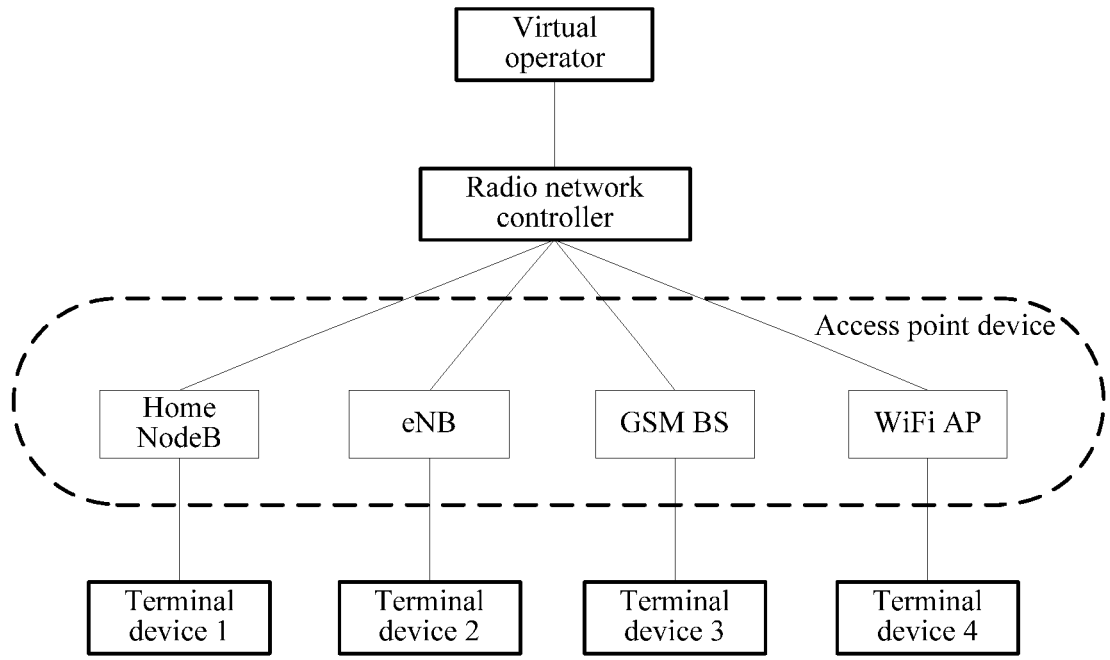
FIG. 1 is a schematic diagram of a system architecture of a wireless communications network according to an embodiment of the present invention.

For ease of understanding, a schematic diagram of a system architecture of a wireless communications network, shown in FIG. 1, according to an embodiment of the present invention is first described. The following briefly describes the system architecture of the wireless communications network in this embodiment of the present invention with reference to FIG. 1.

The wireless communications network shown in FIG. 1 in this embodiment of the present invention may include a virtual operator, a radio network controller, an access point device, and a terminal device.

Control capabilities of the wireless communications network may be separated from the wireless communications network to form the radio network controller (Wireless Controller). The radio network controller provides specific control capabilities to the outside in a form of services. The services may specifically include, but not limited to: a storage service, a real-time computing service, a base station image management service, a virtual machine service, a base station management service, an inter-base station data exchange service, and the like. That is, the radio network controller provides the capabilities of the wireless network, such as a computing capability, a storage capability, a capability of controlling a data exchange between virtual base stations, a virtual machine management capability, and a virtual-base station management capability, to a wireless base station device such as a WiFi access point (AP) or a home NodeB (Femto) in the form of services.

The virtual operator interacts with the radio network controller, to implement control of the wireless base station device, and a main function of the virtual operator is the same as that of a conventional operator.

An infrastructure service layer is formed by one or more of the WiFi AP, the Femto, an evolved node base station (eNB), or a Global System for Mobile Communications (GSM) base station (BS), and all of the above are wireless base station devices formed by a universal hardware platform. Wireless base station software used by the wireless base station device is stored in a form of a virtual machine file in the radio network controller, or may be stored in the wireless base station device. The wireless base station device may start the wireless base station software by loading the virtual machine file by using a virtual machine.

The terminal device (such as a mobile phone or a tablet computer) accesses the wireless base station device such as the WiFi AP, Femto, eNB, or GSM BS. Therefore, in this embodiment of the present invention, the wireless base station device, such as the WiFi AP, Femto, eNB, or GSM BS, that is configured to access the terminal device is collectively referred to as an access point device.

The wireless communications network shown in FIG. 1 may be specifically, for example, a software-defined radio (SDR) network or an open radio access network. SDR is a radio broadcast communications technology, and the SDR is implemented based on a software-defined wireless communication protocol by using a hardware platform remaining unchanged. For example, a frequency band protocol or function or an air interface protocol or function may be configured and upgraded by means of software downloading and update without the need of changing all hardware. A network using the SDR technology is an SDR network.

It should be understood that, in an actual application scenario, quantities and types of a virtual operator and a wireless base station device that are connected to a radio network controller, and a terminal device connected to each wireless base station device are not limited to those shown in FIG. 1. A method for configuring a network standard by an access point, an access point device, a terminal device, and a radio network controller in the embodiments of the present invention are not limited to the network architecture shown in FIG. 1. The embodiments of the present invention may further be applied to another similar network architecture.

Figure 2:
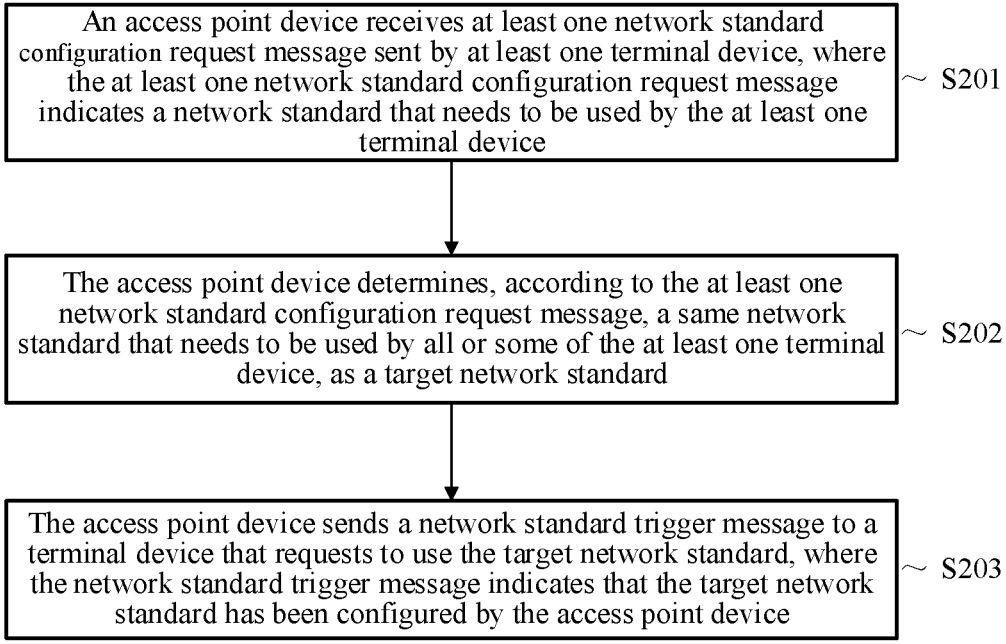
FIG. 2 is a schematic flowchart of a method for determining a network standard in a wireless communications network according to an embodiment of the present invention.

As shown in FIG. 2, FIG. 2 is a schematic flowchart of a method for determining a network standard in a wireless communications network according to an embodiment of the present invention.

S201. An access point device receives at least one network standard configuration request message sent by at least one terminal device, where the at least one network standard configuration request message indicates a network standard that needs to be used by the at least one terminal device.

The access point device may be the WiFi AP, Femto, eNB, or GSM BS shown in FIG. 1. Correspondingly, the terminal device may be the terminal device that accesses the WiFi AP, Femto, eNB, or GSM BS and that is shown in FIG. 1.

The network standard that needs to be used by the terminal device may be actively reported by a user by using the terminal device. That is, the user directly sets, on the terminal device, a network standard that the user intends to use. Once the user enters the network standard that the user intends to use into the terminal device, the terminal device is triggered to send a request message to the access point device, to inform the access point device of the network standard that needs to be used. In this embodiment of the present invention, the request message is referred to as a network standard configuration request message.

Alternatively, the network standard that needs to be used by the terminal device may be obtained in the following manner: the terminal device automatically detects its status and a network status, and comprehensively determines, according to such status information, the network standard that needs to be used by the terminal device. Status information of the terminal device may include an electric quantity status of the terminal device, a distance between the terminal device and the access point device, and other information. For example, when the terminal device is a relatively short distance away from the access point device but has a relatively high traffic requirement, an original cellular mobile communication network standard no longer satisfies a requirement, and a WLAN (Wireless Local Area Network) network standard needs to be used. For another example, when the terminal device is a relatively short distance away from the access point device and also has a very low traffic requirement, but an electric quantity is very low, accessing the access point device by using a Bluetooth mode may save the electric quantity of the terminal device.

Information about the network status may include network standards that are available on a network, charging rules of the network standards, and the like, or may further be network status information of a peer end communicating with the terminal device.

S202. The access point device determines, according to the at least one network standard configuration request message, a same network standard that needs to be used by all or some of the at least one terminal device, as a target network standard.

When the access point device determines the target network standard according to the network standard configuration request message sent by the at least one terminal device, a specific implementation may be: The access point device determines that a proportion of a quantity of terminal devices that request the access point device to configure the same network standard to a quantity of all terminal devices accessing the access point device exceeds a particular threshold. In this case, the access point device may determine that the same network standard requested by these terminal device is a network standard to be configured. For example, when more than 80% of the terminal devices among all the terminal devices accessing the access point device request the access point device to configure the target network standard, the access point device may determine to configure the target network standard.

Specifically, that the access point device determines that a proportion of a quantity of terminal devices that request the access point device to configure the same network standard to a quantity of all terminal devices accessing the access point device exceeds a particular threshold may be: the access point device determines, within a particular time period, that the proportion of the quantity of terminal devices that request the access point device to configure the same network standard to the quantity of all terminal devices accessing the access point device exceeds the particular threshold. For example, when more than 80% of the terminal devices request, within ten minutes, the access point device to configure the target network standard, the access point device may determine to configure the target network standard.

When the access point device determines the target network standard according to the network standard configuration request message sent by the at least one terminal device, a specific implementation may alternatively be: The access point device determines that a priority of a terminal device that requests the access point device to configure a network standard is highest among all terminal devices accessing the access point device. In this case, the access point device may determine to configure, as a network standard, the network standard that the terminal device whose priority is highest requests to configure. Such an implementation is usually used on a femto access point device. For example, when a femto to which a terminal device belongs and that has a highest priority requests to configure the target network standard, the femto determines to configure the target network standard as a network standard.

After determining the target network standard, the access point device may complete configuration of the target network standard in multiple manners. For example, the target network standard is added to the access point device. In this case, multiple network standards may be simultaneously configured on the access point device. That is, not only the target network standard is added to the access point but also an original network standard can be maintained. Alternatively, the access point device may delete or disable an original network standard when the target network standard is configured. That is, the terminal device no longer uses the original network standard to access the access point device, but to use the target network standard newly configured by the access point device to access the access point device.

Alternatively, when receiving the network standard configuration request message sent by the terminal device, the access point device may determine to continue to use an original network standard. In this case, the access point device sends, to a terminal device that requests to use a new network standard, a message of rejecting configuration of the new network standard. After receiving the message of rejecting configuration of the new network standard, the network device may choose to continue to use the original network standard to access the access point device, or may use the new network standard to access another access point device.

After determining the target network standard, the access point device needs to obtain a configuration file for configuring the target network standard. The configuration file may be locally stored on the access point device, or may be stored on a radio network controller. When the configuration file is stored on the radio network controller, the access point device sends a configuration file request message to the radio network controller, and the radio network controller returns the configuration file to the access point device after receiving the request. After the access point device receives the configuration file sent by the radio network controller and runs the configuration file, the corresponding target network standard is configured on the access point device.

When the configuration file is stored on the access point device, the access point device may directly run the configuration file of the target network standard, to complete configuration of the target network standard.

S203. The access point device sends a network standard trigger message to a terminal device that requests to use the target network standard, where the network standard trigger message indicates the target network standard configured by the access point device.

After the target network standard has been configured on the access point device, the access point device needs to send a response message to the terminal device that requests to use the target network standard, to inform the terminal device that the target network standard has already been configured on the access point device. That is, the terminal device may use the target network standard to access the access point device. In this embodiment of the present invention, the response message is referred to as a network standard trigger message.

If the access point device is added with the target network standard while maintaining the original network standard during the configuration of the target network standard, a terminal device that does not request the target network standard may continue to use the original network standard. Therefore, the access point device needs to send the network standard trigger message only to the terminal device that requests the target network standard.

If the access point device disables the original network standard when adding the target network standard during the configuration of the target network standard, the access point device further needs to send the network standard trigger message to another terminal device among the terminal devices accessing the access point device except the terminal device that requests the target network standard, to instruct the another terminal device to use the target network standard to access the access point device.

According to the method for determining a network standard in this embodiment of the present invention, the access point device receives the network standard configuration request message sent by the terminal device, then determines the network standard according to the network standard configuration request message, and sends the network standard trigger message to the terminal device, to inform the terminal device that the target network standard has already been configured by the access point device, so that the access point device can flexibly configure a network standard according to a requirement of a terminal device, thereby saving resources and improving resource utilization.

In this embodiment of the present invention, optionally, an implementation of S202 may specifically include: sending, by the access point device, a decision request message to a radio network controller, where the decision request message is used to indicate, to the radio network controller, new network standards that terminal devices accessing the access point device request to configure; receiving, by the access point device, a decision response message sent by the radio network controller, where the decision response message is used to indicate the target network standard, and the target network standard is a network standard that is determined by the radio network controller according to the decision response message and information about the access point device controlled by the radio network controller; and determining, by the access point device, the target network standard according to the decision response message.

The radio network controller may be the radio network controller shown in FIG. 1. Optionally, after receiving the network standard configuration request sent by the terminal device, the access point device may determine, according to a preset condition, whether to send the decision request message to the radio network controller, so that the radio network controller determines the target network standard according to the decision request message.

The foregoing preset condition may include: a proportion of a quantity of terminal devices that request the access point device to configure the new network standards to a quantity of all terminal devices accessing the access point device exceeds a particular threshold. In this case, the access point device may send the decision request message to the radio network controller. For example, when more than 80% of the terminal devices among all the terminal devices accessing the access point device request to re-configure a network standard, the access point device sends the decision request message to the radio network controller.

Optionally, that the access point device determines that a proportion of a quantity of terminal devices that request the access point device to configure the new network standards to a quantity of all terminal devices accessing the access point device exceeds a particular threshold may be specifically: the access point device determines, at a preset time point or within a preset time period, such as every half an hour, that the proportion of the quantity of terminal devices that request the access point device to configure the new network standards to the quantity of all terminal devices accessing the access point device exceeds the particular threshold. In this case, the access point device sends the decision request message to the radio network controller.

The decision request message may carry types of network standards that need to be used by the terminal devices, including the new network standards that the terminal devices sending the request message request to use and a network standard that is currently used by a terminal device that does not send a request. All or some of the terminal devices sending the request need to use a same network standard, and the same network standard may be referred to as a target network standard. The radio network controller determines, according to the types of the network standards that need to be used by the terminal devices, the network standard that needs to be configured by the access point device, as the target network standard. For example, when more than 80% (which may also be another value) of the terminal devices among all the terminal devices accessing the access point device request the access point device to configure the target network standard, the radio network controller determines the network standard that needs to be configured by the access point device, as the target network standard.

That the radio network controller determines the network standard that should be configured by the access point device, as the target network standard may be specifically implemented in the following two manners: the radio network controller determines that the access point device may add the target network standard and maintain an original network standard; or the radio network controller determines that the access point device may add the target network standard but disable an original network standard. "Disable an original network standard" may be deleting the original network standard.

Optionally, the radio network controller may determine, according to the decision request message and information about another access point device controlled by the radio network controller, the network standard that needs to be configured by the access point device, as the target network standard. If the radio network controller determines that the access point device is to configure the target network standard, the radio network controller may further determine another access point device to which a terminal device that does not need to use the target network standard may access. In this case, the decision response message that is sent by the radio network controller to the access point device may indicate that the network standard to be configured by the access point device is the target network standard, or may instruct the access point device to send information about the access point device to which the terminal device that does not use the target network standard may access by using a network standard that needs to be used. Correspondingly, after receiving the decision response message and obtaining a configuration file for configuring the target network standard, the access point device not only sends a message to the terminal device that requests to use the target network standard, to instruct the terminal device to use the target network standard to access the access point device, but also sends a message to the terminal device that does not use the target network standard, to instruct the terminal device to use the original network standard to access the corresponding access point device.

The configuration file for configuring the target network standard may be stored on the access point device, or may be stored on the radio network controller. If the configuration file is stored on the access point device, the access point device may configure the target network standard by directly running the configuration file. If the configuration file is stored on the radio network controller, the configuration file may be actively sent by the radio network controller to the access point device after the radio network controller determines that the access point device is to configure the target network standard, or may be requested by the access point device from the radio network controller after the access point device receives the decision response message sent by the radio network controller and determines to configure the target network standard. In this case, the method for configuring a network standard in this embodiment of the present invention may further include: sending, by the access point device, a configuration file request message to the radio network controller; and receiving, by the access point device, the configuration file that is sent according to the configuration file request message by the radio network controller for configuring the target network standard.

In this embodiment of the present invention, optionally, after determining to configure the target network standard, the access point device may send a message to the terminal device, to inform the terminal device that the access point device already determines to configure the target network standard and the terminal device may prepare to use the target network standard.

Optionally, the method for determining a network standard in this embodiment of the present invention may further include: establishing, by the access point device, a link to the terminal device by using the target network standard; communicating, by the access point device, with the terminal device by using the newly established link; and sending, by the access point device, a message to the radio network controller, to inform the radio network controller that the network standard of the access point device has already re-configured as the target network standard.

According to the method for determining a network standard in this embodiment of the present invention, the access point device sends information about the network standard that needs to be used by the terminal device and information about the terminal device to the radio network controller, and the radio network controller determines, with reference to the information about the another access point device, whether the access point device needs to configure the new network standard, so that each terminal device can use a network standard satisfying its requirement, thereby further improving resource utilization.

Figure 3:
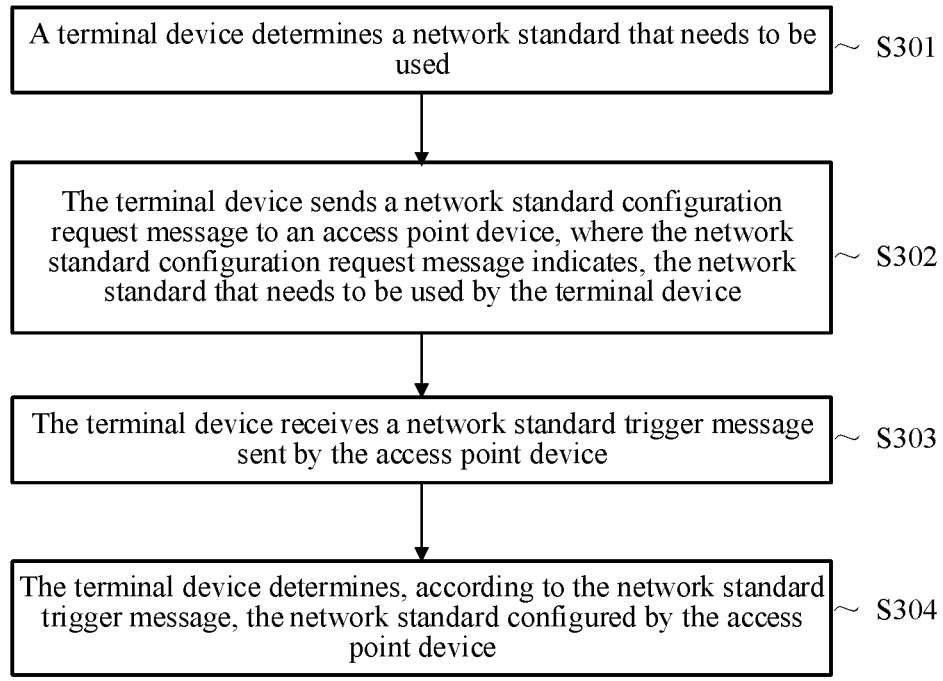
FIG. 3 is a schematic flowchart of a method for determining a network standard in a wireless communications network according to another embodiment of the present invention.

As shown in FIG. 3, FIG. 3 is a schematic flowchart of a method for determining a network standard in a wireless communications network according to another embodiment of the present invention.

S301. A terminal device determines a network standard that needs to be used.

The terminal device may be the terminal device that accesses the WiFi AP, Femto, eNB, or GSM BS and that is shown in FIG. 1.

The network standard that needs to be used by the terminal device may be actively reported by a user by using the terminal device. That is, the user directly sets, on the terminal device, a network standard that the user intends to use. Once the user enters the network standard that the user intends to use into the terminal device, the terminal device is triggered to send a request message to an access point device, to inform the access point device of the network standard that needs to be used. In this embodiment of the present invention, the request message is referred to as a network standard configuration request message.

Alternatively, the network standard that needs to be used by the terminal device may be obtained in the following manner: the terminal device automatically detects its status and a network status, and comprehensively determines, according to such status information, the network standard that needs to be used by the terminal device. Status information of the terminal device may include an electric quantity status of the terminal device, a distance between the terminal device and the access point device, and other information. For example, when the terminal device is a relatively short distance away from the access point device but has a relatively high traffic requirement, an original cellular mobile communication network standard no longer satisfies a requirement, and a WLAN network standard needs to be used. For another example, when the terminal device is a relatively short distance away from the access point device and also has a very low traffic requirement, but an electric quantity is very low, accessing the access point device by using a Bluetooth mode may satisfy a requirement more effectively.

Information about the network status may include network standards that are available on a network, charging rules of the network standards, and the like, or may further be network status information of a peer end communicating with the terminal device.

S302. The terminal device sends a network standard configuration request message to an access point device, where the network standard configuration request message indicates the network standard that needs to be used by the terminal device.

The access point device may be the WiFi AP, Femto, eNB, or GSM BS shown in FIG. 1.

S303. The terminal device receives a network standard trigger message sent by the access point device.

The network standard trigger message may be used to indicate, to the terminal device, that the terminal device may use the requested network standard to access the access point device, or may be used to indicate, to the terminal, that the terminal device may continue to use an original network standard to access the access point device, or may be used to indicate, to the terminal device, that the terminal device may use the requested network standard to access another access point device.

S304. The terminal device determines, according to the network standard trigger message, the network standard configured by the access point device.

After receiving the network standard trigger message sent by the access point device, the terminal device accesses a corresponding access point device according to an indication message in the network standard trigger message.

In this embodiment of the present invention, optionally, the terminal device may further receive a message that is sent by the access point device after the access point device determines to configure the target network standard and that is used to inform the terminal device that the access point device already determines to configure the target network standard and the terminal device may prepare to use the target network standard.

Optionally, the method for configuring a network standard in this embodiment of the present invention may further include: establishing, by the terminal device, a link to the access point device by using the target network standard; and communicating, by the terminal device, with the access point device by using the newly established link.

According to the method for determining a network standard in this embodiment of the present invention, the terminal device sends information about the network standard that needs to be used to the access point device. The access point device determines whether a new network standard needs to be configured. Then, the terminal device receives a notification message sent by the access point device, and accesses the access point device according to the notification message, so that the terminal device can use a network standard satisfying its requirement, thereby improving resource utilization.

Figure 4:
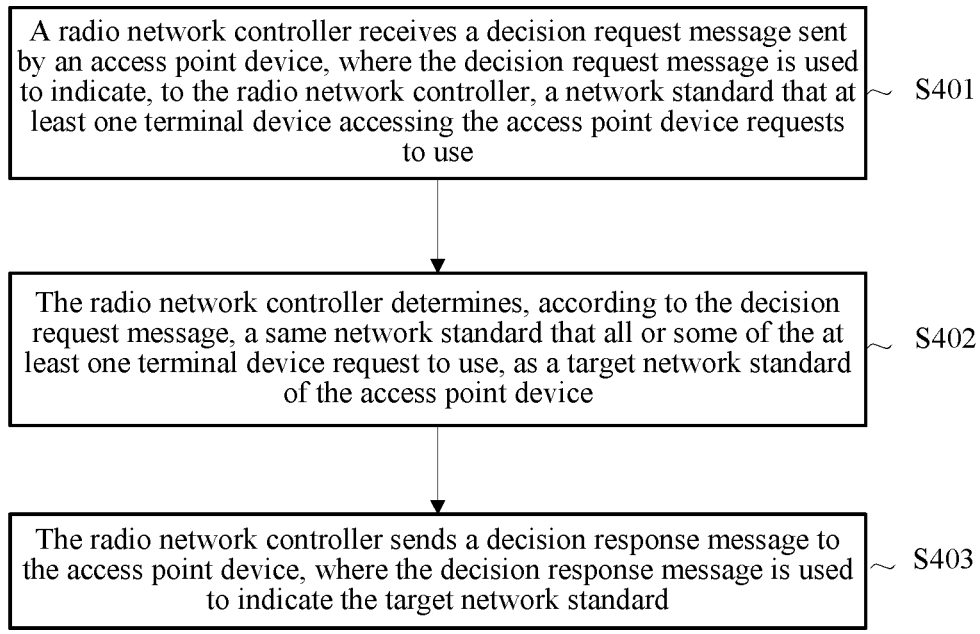
FIG. 4 is a schematic flowchart of a method for determining a network standard in a wireless communications network according to still another embodiment of the present invention.

As shown in FIG. 4, FIG. 4 is a schematic flowchart of a method for determining a network standard in a wireless communications network according to another embodiment of the present invention.

S401. A radio network controller receives a decision request message sent by an access point device, where the decision request message is used to indicate, a network standard that at least one terminal device accessing the access point device requests to use.

The radio network controller may be the radio network controller shown in FIG. 1. Correspondingly, the access point device may be the WiFi AP, Femto, eNB, or GSM BS shown in FIG. 1. The terminal device is the terminal device that accesses the WiFi AP, Femto, eNB, or GSM BS and that is shown in FIG. 1.

S402. The radio network controller determines, according to the decision request message, a same network standard that all or some of the at least one terminal device request to use, as a target network standard of the access point device.

Specifically, when the radio network controller determines, according to the decision request message, to configure the target network standard on the access point device, the radio network controller may determine, when more than 80% of the terminal devices among all terminal devices accessing the access point device request the access point device to configure the target network standard, to configure the target network standard on the access point device.

Optionally, the radio network controller may further determine, according to the decision request message and information about another access point device controlled by the radio network controller, the network standard that should be configured on the access point device, as the target network standard. The information about the another access point device may include information such as a distance between the another access point device and the terminal device. In this way, when determining that the access point device is to configure the target network standard, the radio network controller may further determine a corresponding access point device to which a terminal device that does not need to use the target network standard may access.

S403. The radio network controller sends a decision response message to the access point device, where the decision response message is used to indicate the target network standard.

After determining that the access point device may configure the target network standard, the radio network controller may send a message to the access point device, to inform the access point device that the target network standard may be configured. The message may be referred to as a decision response message.

If the radio network controller determines, according to the decision request message and the information about the another access point device, that the access point device may configure the target network standard, in addition to informing the access point device that the target network standard may be configured, the decision response message may be further used to instruct the access point device to instruct the terminal device that does not request to use the target network standard to access the corresponding another access point device.

In this embodiment of the present invention, after determining that the access point device may configure the target network standard, the radio network controller may further actively send a configuration file for implementing the target network standard to the access point device. Certainly, the radio network controller may send, after the access point device receives the decision response message and sends a message to the radio network controller to request a configuration file for implementing the target network standard, the configuration file to the access point device according to the message for requesting the configuration file.

According to the method for determining a network standard in this embodiment of the present invention, the radio network controller receives information about the network standard that needs to be used by the terminal device and information about the terminal device, where the information about the network standard and the information about the terminal device are sent by the access point device, and the radio network controller determines, according to the information about the terminal device with reference to the information about the another access point device, whether the access point device needs to configure a new network standard, so that each terminal device can use a network standard satisfying its requirement, thereby improving resource utilization.

Figure 5:
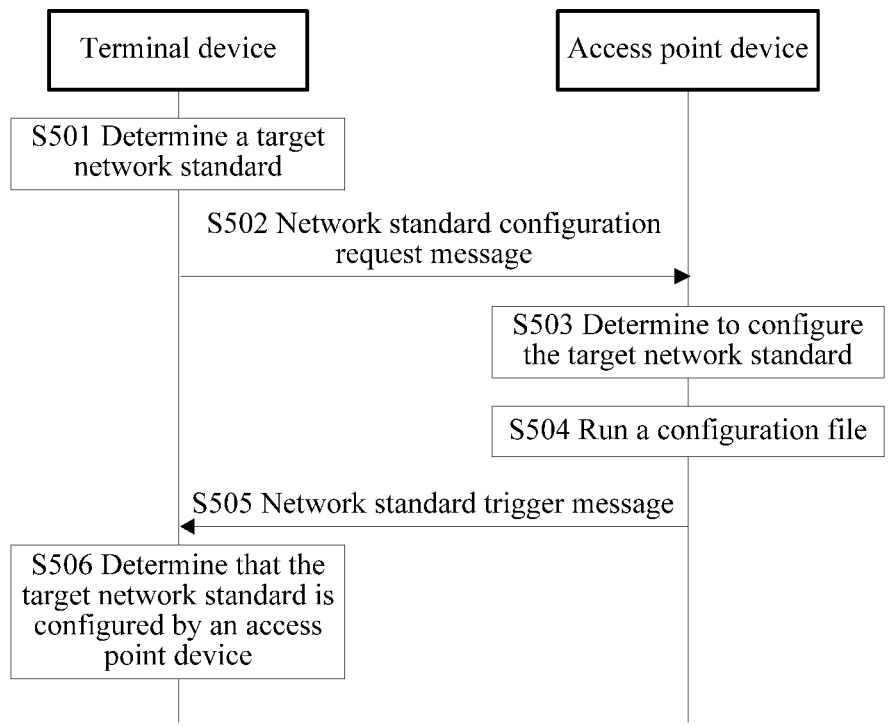
FIG. 5 is a schematic flowchart of a method for determining a network standard in a wireless communications network according to still another embodiment of the present invention.

As shown in FIG. 5, FIG. 5 is a schematic diagram of a process of determining a network standard in a wireless communications network according to an embodiment of the present invention. An access point device shown in FIG. 5 may be the WiFi AP, Femto, eNB, GSM BS, or the like shown in FIG. 1. A terminal device shown in FIG. 5 may be the terminal device that accesses the WiFi AP, Femto, eNB, or GSM BS and that is shown in FIG. 1.

S501. The terminal device determines a network standard that needs to be used.

S502. The terminal device sends a network standard configuration request message to the access point device, where the network standard configuration request message is used indicate, to the access point device, the network standard that needs to be used by the terminal device, and the access point device receives the network standard configuration request message.

S503. The access point device determines, according to the received network standard configuration request message, a network standard that all terminal devices or some terminal devices sending the network standard configuration request message request to use, as a target network standard.

S504. The access point device runs a configuration file. The access point device runs the configuration file of the target network standard to complete configuration of the target network standard.

S505. The access point device sends a network standard trigger message to the terminal device, to instruct the terminal device to use the target network standard to access the access point device, and the terminal device receives the network standard trigger message.

S506. The terminal device determines that the target network standard is configured by the access point device.

According to the method for determining a network standard in a wireless communications network in the present invention, the access point device receives the network standard configuration request message sent by the terminal device, then determines, according to the network standard configuration request message, a network standard to be configured, and sends the network standard trigger message to the terminal device, to inform the terminal device that the target network standard has already been configured by the access point device, so that the access point device can flexibly configure a network standard according to a requirement of a terminal device, thereby saving resources and improving resource utilization.

It should be understood that, the foregoing and other operations and/or functions of the access point device in the method for determining a network standard shown in FIG. 5 are the same as or similar to the operations and/or functions of the access point device in the method shown in FIG. 2, and the foregoing and other operations and/or functions of the terminal device in the method for configuring a network standard shown in FIG. 5 are the same as or similar to the operations and/or functions of the terminal device in the method shown in FIG. 3. For brevity, details are not described herein again.

Figure 6:
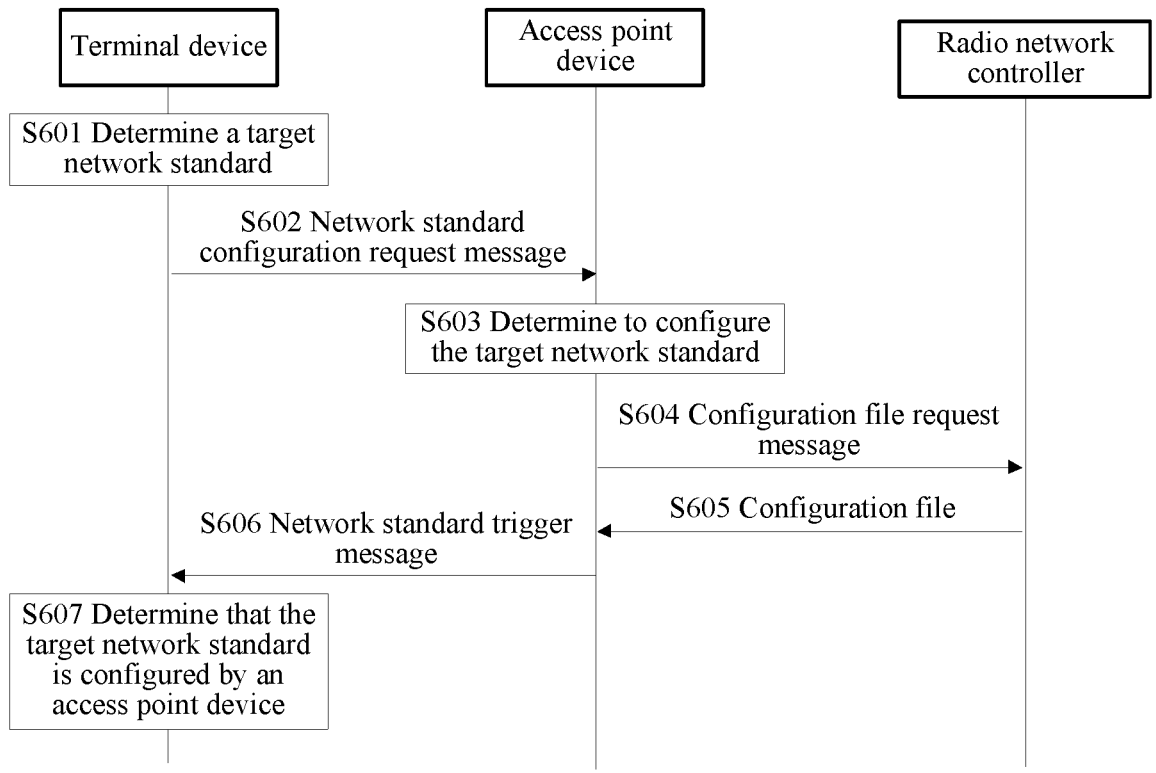
FIG. 6 is a schematic flowchart of a method for determining a network standard in a wireless communications network according to still another embodiment of the present invention.

As shown in FIG. 6, FIG. 6 is a schematic diagram of a process of determining a network standard in a wireless communications network according to another embodiment of the present invention. An access point device shown in FIG. 6 may be the WiFi AP, Femto, eNB, GSM BS, or the like shown in FIG. 1. A terminal device shown in FIG. 6 may be the terminal device that accesses the WiFi AP, Femto, eNB, or GSM BS and that is shown in FIG. 1. A radio network controller shown in FIG. 6 may be the radio network controller shown in FIG. 1.

S601. The terminal device determines a network standard that needs to be used.

S602. The terminal device sends a network standard configuration request message to the access point device, where the network standard configuration request message is used indicate, to the access point device, the network standard that needs to be used by the terminal device, and the access point device receives the network standard configuration request message.

S603. The access point device determines, according to the received network standard configuration request message, a network standard that need to be used by all terminal devices or some terminal devices sending the network standard configuration request message, as a target network standard.

S604. The access point device sends a configuration file request message to the radio network controller, to obtain a configuration file for configuring the target network standard, and the radio network controller receives the configuration file request message.

S605. The radio network controller sends the configuration file for implementing the target network standard to the access point device, and the access point device receives the configuration file.

S606. The access point device sends a network standard trigger message to the terminal device, to indicate, to the terminal device, that the target network standard has already been configured by the access point device, and the terminal device receives the network standard trigger message.

S607. The terminal device determines, according to the received network standard trigger message, that the target network standard has been configured by the access point device.

According to the method for determining a network standard in a wireless communications network in the present invention, the access point device receives the network standard configuration request message sent by the terminal device, then determines, according to the network standard configuration request message, a network standard to be configured, and then obtains the configuration file of the target network standard from the radio network controller and sends the network standard trigger message to the terminal device, to inform the terminal device that the target network standard has already been configured by the access point device, so that the access point device can flexibly configure a network standard according to a requirement of a terminal device, thereby saving resources and improving resource utilization.

It should be understood that, the foregoing and other operations and/or functions of the access point device in the method for determining a network standard shown in FIG. 6 are the same as or similar to the operations and/or functions of the access point device in the method shown in FIG. 2, and the foregoing and other operations and/or functions of the terminal device in the method for configuring a network standard by an access point shown in FIG. 6 are the same as or similar to the operations and/or functions of the terminal device in the method shown in FIG. 3. For brevity, details are not described herein again.

Figure 7:
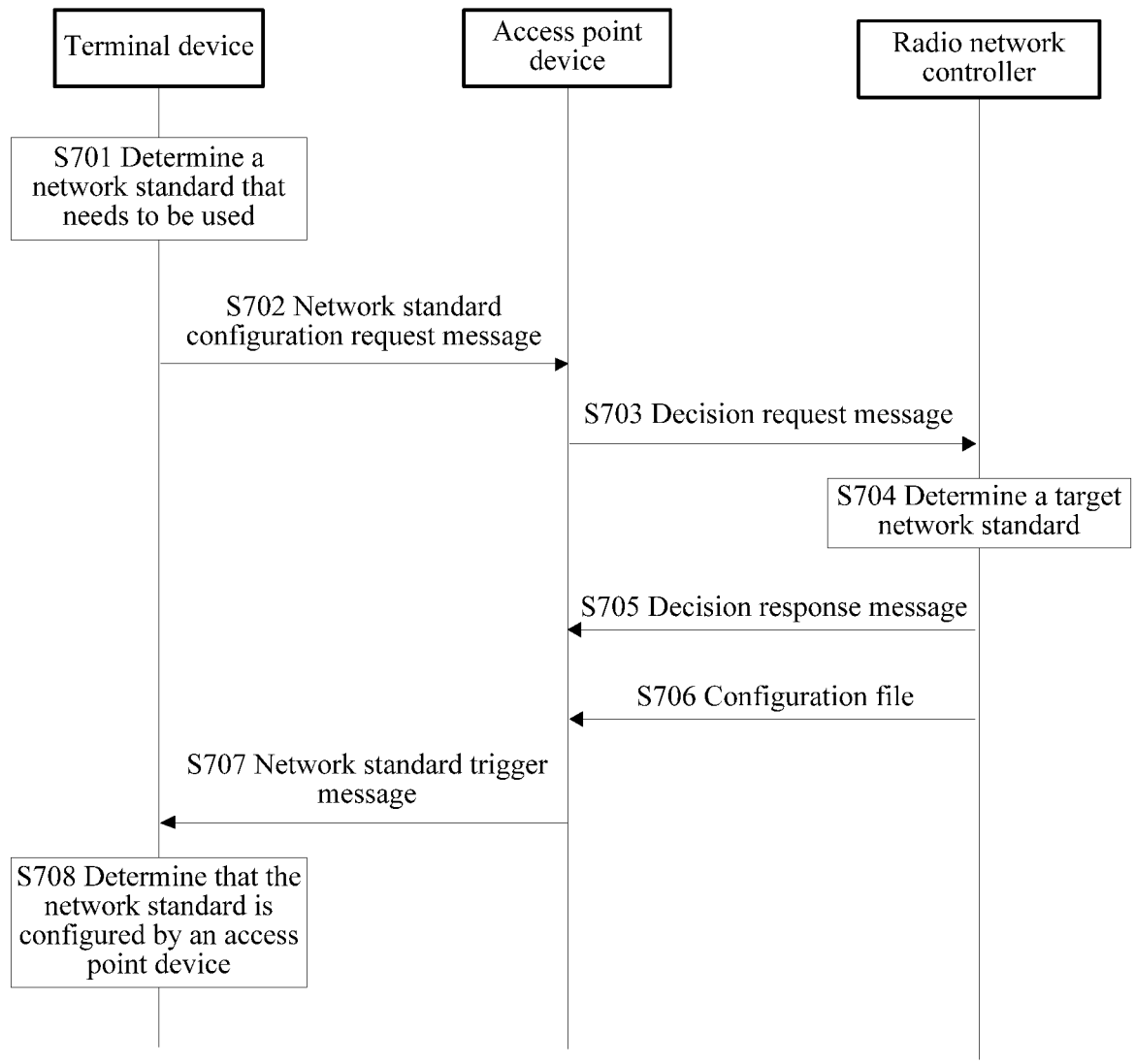
FIG. 7 is a schematic flowchart of a method for determining a network standard in a wireless communications network according to still another embodiment of the present invention.

As shown in FIG. 7, FIG. 7 is a schematic diagram of a process of determining a network standard in a wireless communications network according to another embodiment of the present invention. An access point device shown in FIG. 7 may be the WiFi AP, Femto, eNB, GSM BS, or the like shown in FIG. 1. A terminal device shown in FIG. 7 may be the terminal device that accesses the WiFi AP, Femto, eNB, or GSM BS and that is shown in FIG. 1. A radio network controller shown in FIG. 7 may be the radio network controller shown in FIG. 1.

S701. The terminal device determines a network standard that needs to be used.

S702. The terminal device sends a network standard configuration request message to the access point device, where the network standard configuration request message is used indicate, to the access point device, the network standard that needs to be used by the terminal device, and the access point device receives the network standard configuration request message.

S703. The access point device sends a decision request message to the radio network controller, to inform the radio network controller of the network standard that needs to be used by the terminal device that sends the network standard configuration request message to the access point device and a network standard that is currently used by a terminal device that does not send the network standard configuration request message that are on the access point device, and the radio network controller receives the decision request message.

S704. The radio network controller determines, according to the received decision request message, a target network standard that should be configured by the access point device, where the target network standard is a network standard that needs to be used by all terminal devices or some terminal devices sending the network standard configuration request message. Certainly, the radio network controller may further determine, with reference to information about another access point device, that the access point device may configure the target network standard.

S705. The radio network controller sends a decision response message to the access point device, to indicate, to the access point device, the target network standard that should be configured, and the access point device receives the decision response message.

S706. The radio network controller sends a configuration file for configuring the target network standard to the access point device, and the access point device receives the configuration file. Certainly, the configuration file may alternatively be configured on the access point device. In this case, this step may not be performed.

S707. The access point device sends a network standard trigger message to the terminal device, to instruct the terminal device to use the target network standard to access the access point device, and the terminal device receives the network standard trigger message.

S708. The terminal device accesses the access point device by using the target network standard.

According to the method for determining a network standard in this embodiment of the present invention, after receiving a message, about the network standard that needs to be used, sent by the terminal device, the access point device sends the decision response message to the radio network controller. The radio network controller receives the information, about the network standard that needs to be used by the terminal device, sent by the access point device, and determines, according to information about the terminal device, a network standard that configuration needs to be performed by the access point device, so that each terminal device can use a network standard satisfying its requirement, thereby improving resource utilization.

It should be understood that, the foregoing and other operations and/or functions of the access point device in the method for determining a network standard shown in FIG. 7 are the same as or similar to the operations and/or functions of the access point device in the method shown in FIG. 2, and the foregoing and other operations and/or functions of the terminal device in the method for configuring a network standard shown in FIG. 7 are the same as or similar to the operations and/or functions of the terminal device in the method shown in FIG. 3. The foregoing and other operations and/or functions of the radio network controller in the method for determining a network standard shown in FIG. 7 are the same as or similar to the operations and/or functions of the radio network controller in the method shown in FIG. 4. For brevity, details are not described herein again.

The foregoing describes in detail the methods for determining a network standard in a wireless communications network in the embodiments of the present invention with reference to FIG. 2 to FIG. 7, and the following describes in detail an access point device, a terminal device, and a radio network controller for determining a network standard in a wireless communications network in embodiments of the present invention with reference to FIG. 8 to FIG. 15.

Figure 8:
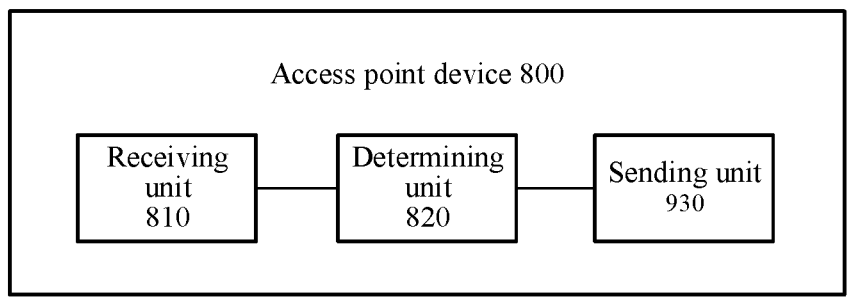
FIG. 8 is a schematic block diagram of an access point device in a wireless communications network according to an embodiment of the present invention.

FIG. 8 is a schematic block diagram of an access point device 800 in a wireless communications network according to an embodiment of the present invention. The access point device shown in FIG. 8 includes a receiving unit 810, a determines unit 820, and a sending unit 830.

The receiving unit 810 is configured to receive at least one network standard configuration request message sent by at least one terminal device, where the at least one network standard configuration request message indicates a network standard that needs to be used by the at least one terminal device.

The determining unit 820 is configured to determine, according to the network standard configuration request message sent by the at least one terminal device, a same network standard that needs to be used by all or some of the at least one terminal device, as a target network standard.

The sending unit 830 is configured to send a network standard trigger message to the all or some of the at least one terminal device, where the network standard trigger message is used to indicate the target network standard configured by the access point device.

The access point device in this embodiment of the present invention first receives the network standard configuration request message sent by the terminal device, then determines a new network standard according to the network standard configuration request message, and sends the network standard trigger message to the terminal device, to indicate that the target network standard has been configured by the access point device, so that the access point device can flexibly configure a network standard according to a requirement of a terminal device, thereby saving resources and improving resource utilization.

Optionally, the determining unit 820 may be specifically configured to: when a proportion of the terminal devices that request the same network standard to terminal devices accessing the access point device exceeds a target threshold, determine the same network standard as the target network standard.

Optionally, the determining unit 820 may be further specifically configured to determine a network standard that is requested by a terminal device whose priority is highest, as the target network standard.

Optionally, the sending unit 830 is further configured to send the network standard trigger message to another terminal device that does not request the target network standard among the terminal devices accessing the access point device, where the network standard trigger message is used to indicate that the target network standard has already been configured by the access point device.

Optionally, the sending unit 830 may be further configured to send a configuration file request message to a radio network controller. The receiving unit 810 receives a configuration file that is sent according to the configuration file request message by the radio network controller for configuring the target network standard. In this case, the access point device 800 further includes a configuration unit, configured to configure the target network standard according to the configuration file.

Optionally, the sending unit 830 may be further configured to send a decision request message to a radio network controller, where the decision request message is used to indicate, to the radio network controller, the network standard that needs to be used by the at least one terminal device. In this case, the receiving unit 810 is further specifically configured to receive a decision response message that is sent by the radio network controller according to the decision request message, where the decision response message is used to indicate the target network standard, and the target network standard is the same network standard that needs to be used by the all or some of the at least one terminal device. The determining unit 820 is further specifically configured to determine the target network standard according to the decision response message.

The access point device in this embodiment of the present invention receives the network standard configuration request message that is sent by the terminal device for indicating the network standard that needs to be used by the terminal device, and sends information about the network standard that needs to be used by the terminal device to the radio network controller. The radio network controller determines, with reference to information about another access point device, whether the access point device needs to configure a new network standard, so that each terminal device can use a network standard satisfying its requirement, thereby further improving resource utilization.

Optionally, the receiving unit 810 may be further configured to receive a decision response message that is sent by the radio network controller according to the decision request message and information about another access point device. In this case, the decision response message is further used to instruct the access point device to instruct another terminal device among terminal devices accessing the access point device except the all or some of the at least one terminal device to access the another access point device. Correspondingly, the sending unit 830 may be further configured to send a network standard trigger message to the another terminal device according to the decision response message, where the network standard trigger message is used to instruct the another terminal device to access the another access point device.

Optionally, the receiving unit 810 may be further configured to receive a configuration file that is sent by the radio network controller for configuring the target network standard.

Figure 9:
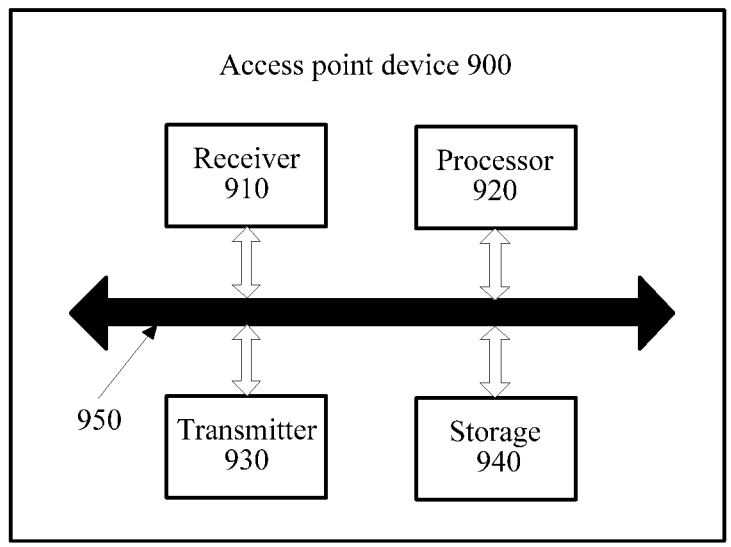
FIG. 9 is a schematic block diagram of an access point device in a wireless communications network according to another embodiment of the present invention.

FIG. 9 is a schematic block diagram of an access point device 900 in a wireless communications network according to an embodiment of the present invention. The access point device shown in FIG. 9 includes a receiver 910, a processor 920, a transmitter 930, a storage 940, and a system bus 950. The processor 920, the storage 940, the receiver 910, and the transmitter 930 are connected by using the bus system 950. The storage 940 is configured to store an instruction. The processor 920 is configured to execute the instruction stored in the storage 940, to control the receiver 910 to receive a signal and control the transmitter 930 to send a signal.

The access point device 900 may correspond to the access point device in the method 300, the method 400, or the method 500, or may correspond to the access point device shown in FIG. 8. Specifically, the receiver 910 corresponds to the receiving unit 810 in FIG. 8, the processor 920 corresponds to the determining unit and the configuration unit in FIG. 8, and the transmitter 930 corresponds to the sending unit in FIG. 8. The foregoing and other operations and/or functions of the units of the access point device 900 in this embodiment of the present invention are separately used to implement the corresponding procedures of the methods in FIG. 2 to FIG. 7. It should be understood that, in a process in which the access point device 900 implements the procedure of any one of the methods in FIG. 2 to FIG. 7, the processor 920 is configured to execute the instruction stored in the storage 940, to control the receiver 910 to receive each message or packet that is received by the access point device in the corresponding method procedure, and control the transmitter 930 to send each message or packet that is sent by the access point device in the corresponding method procedure. For brevity, details are not described herein again.

Figure 10:
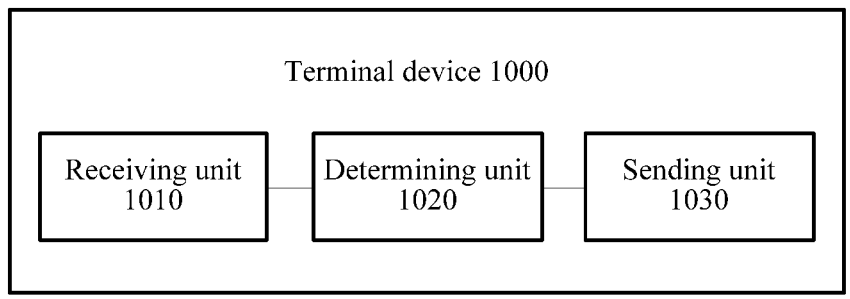
FIG. 10 is a schematic block diagram of a terminal device in a wireless communications network according to an embodiment of the present invention.

FIG. 10 is a schematic block diagram of a terminal device 1000 in a wireless communications network according to an embodiment of the present invention. The terminal device 1000 shown in FIG. 10 includes a receiving unit 1010, a determining unit 1020, and a sending unit 1030.

The determining unit 1020 is configured to determine a network standard that needs to be used. The sending unit 1030 is configured to send a network standard configuration request message to an access point device, where the network standard configuration request message is used to indicate, to the access point device, the network standard that needs to be used by the terminal device. The receiving unit 1010 is configured to receive a network standard trigger message sent by the access point device. The determining unit 1020 is configured to determine, according to the network standard trigger message, a target network standard configured by the access point device.

Optionally, the determining unit 1020 may be specifically configured to determine that the network standard that needs to be used is a network standard entered by a user. Alternatively, the determining unit 1020 may be specifically configured to determine the needed network standard according to at least one type of status information of status information of the terminal device or status information of the wireless communications network that is collected by the terminal device.

The terminal device in this embodiment of the present invention sends information about the network standard that needs to be used to the access point device. The access point device determines whether a new network standard needs to be configured. Then, the terminal device receives a notification message sent by the access point device, and accesses the access point device according to the notification message, so that the terminal device can use a network standard satisfying its requirement, thereby improving resource utilization.

Figure 11:
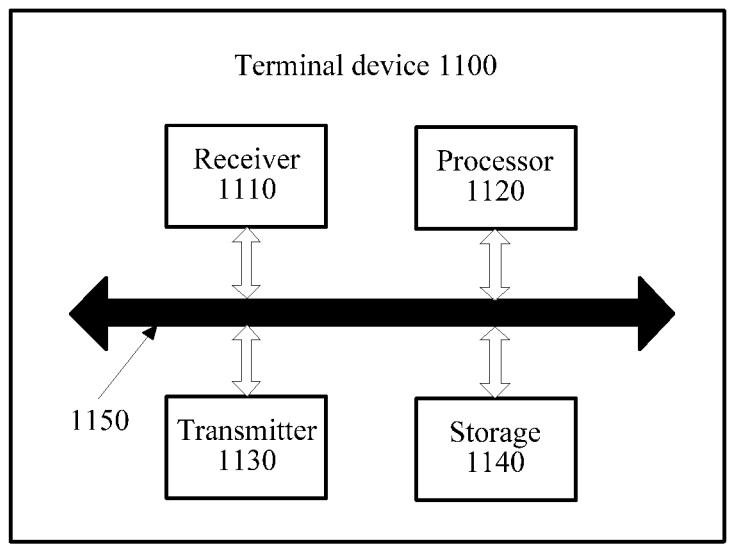
FIG. 11 is a schematic block diagram of a terminal device in a wireless communications network according to another embodiment of the present invention.

FIG. 11 is a schematic block diagram of a terminal device 1100 in a wireless communications network according to an embodiment of the present invention. The access point device shown in FIG. 11 includes a receiver 1110, a processor 1120, a transmitter 1130, a storage 1140, and a system bus 1150. The processor 1120, the storage 1140, the receiver 1110, and the transmitter 1130 are connected by using the bus system 1150. The storage 1140 is configured to store an instruction. The processor 1120 is configured to execute the instruction stored in the storage 1140, to control the receiver 1110 to receive a signal and control the transmitter 1130 to send a signal.

The terminal device 1100 may correspond to the terminal device in the method 300, the method 400, or the method 500, or may correspond to the terminal device shown in FIG. 10. Specifically, the receiver 1110 corresponds to the receiving unit in the terminal device 1000, the processor 1120 corresponds to the determining unit in the terminal device 1000, and the transmitter 1130 corresponds to the sending unit in the terminal device 1000. The foregoing and other operations and/or functions of the units of the terminal device 1000 in this embodiment of the present invention are separately used to implement the corresponding procedures of the methods in FIG. 2 to FIG. 7. It should be understood that, in a process in which the access point device 1100 implements the procedure of any one of the methods in FIG. 2 to FIG. 7, the processor 1120 is configured to execute the instruction stored in the storage 1140, to control the receiver 1110 to receive each message or packet that is received by the access point device in the corresponding method procedure, and control the transmitter 1130 to send each message or packet that is sent by the access point device in the corresponding method procedure. For brevity, details are not described herein again.

The terminal device in this embodiment of the present invention sends information about the network standard that needs to be used to the access point device. The access point device determines whether a new network standard needs to be configured. Then, the terminal device receives a notification message sent by the access point device, and accesses the access point device according to the notification message, so that the terminal device can use a network standard satisfying its requirement, thereby improving resource utilization.

Figure 12:
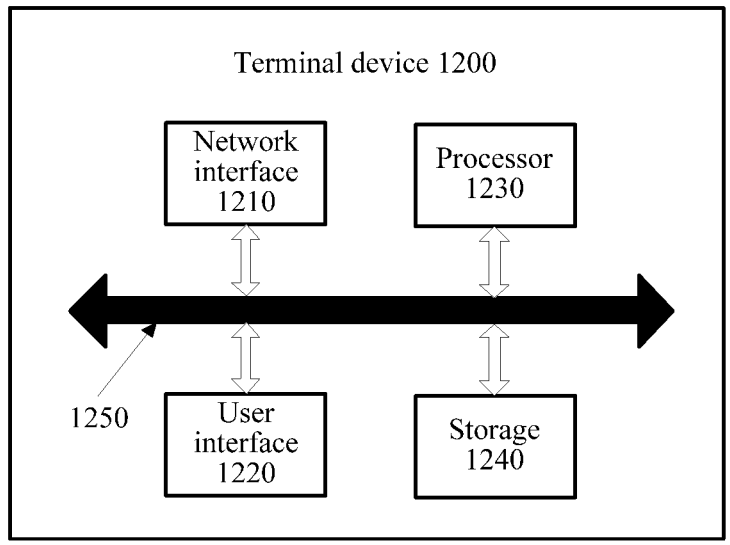
FIG. 12 is a schematic block diagram of a terminal device in a wireless communications network according to another embodiment of the present invention.

FIG. 12 describes a structure of a terminal device 1200 according to an embodiment of the present invention. The terminal device 1200 includes: at least one network interface 1210 or another user interface 1220, at least one processor 1230, a storage 1240, and at least one communications bus 1250. The communications bus 1250 is configured to implement connection and communication between the components. The terminal device 1200 optionally includes the user interface 1220, and includes a display (such as a touchscreen, an LCD, a CRT, holographic imaging, or a projector), a keyboard, or a clicking device (such as a mouse, a trackball (trackball), a touch panel, or a touchscreen).

The storage 1240 may include a read-only memory and a random access memory, and provide an instruction and data to the processor 1230. A part of the storage 1240 may further include a non-volatile random access memory (NVRAM). In some implementations, the storage 1240 stores the following elements: an executable module or a data structure, or a subset thereof, or an extension set thereof.

In this embodiment of the present invention, by invoking a program or the instruction stored in the storage 1240, the processor 1230 is configured to determine a network standard that needs to be used the terminal device 1200. The network interface 1210 is configured to send a network standard configuration request message to an access point device, where the network standard configuration request message indicates the network standard that needs to be used by the terminal device. The network interface 1210 is further configured to receive a network standard trigger message sent by the access point device. The processor 1230 is further configured to determine, according to the network standard trigger message, the network standard configured by the access point device.

Optionally, in an embodiment, the processor 1230 is specifically configured to determine that the network standard that needs to be used is a network standard entered by a user. Alternatively, the processor 1230 is specifically configured to determine, according to at least one type of status information of status information of the terminal device or status information of the wireless communications network that is collected by the terminal device, the network standard needed by the terminal device.

As can be learned, the terminal device in this embodiment of the present invention sends information about the network standard that needs to be used to the access point device. The access point device determines whether a new network standard needs to be configured. Then, the terminal device receives a notification message sent by the access point device, and accesses the access point device according to the notification message, so that the terminal device can use a network standard satisfying its requirement, thereby improving resource utilization.

Figure 13:
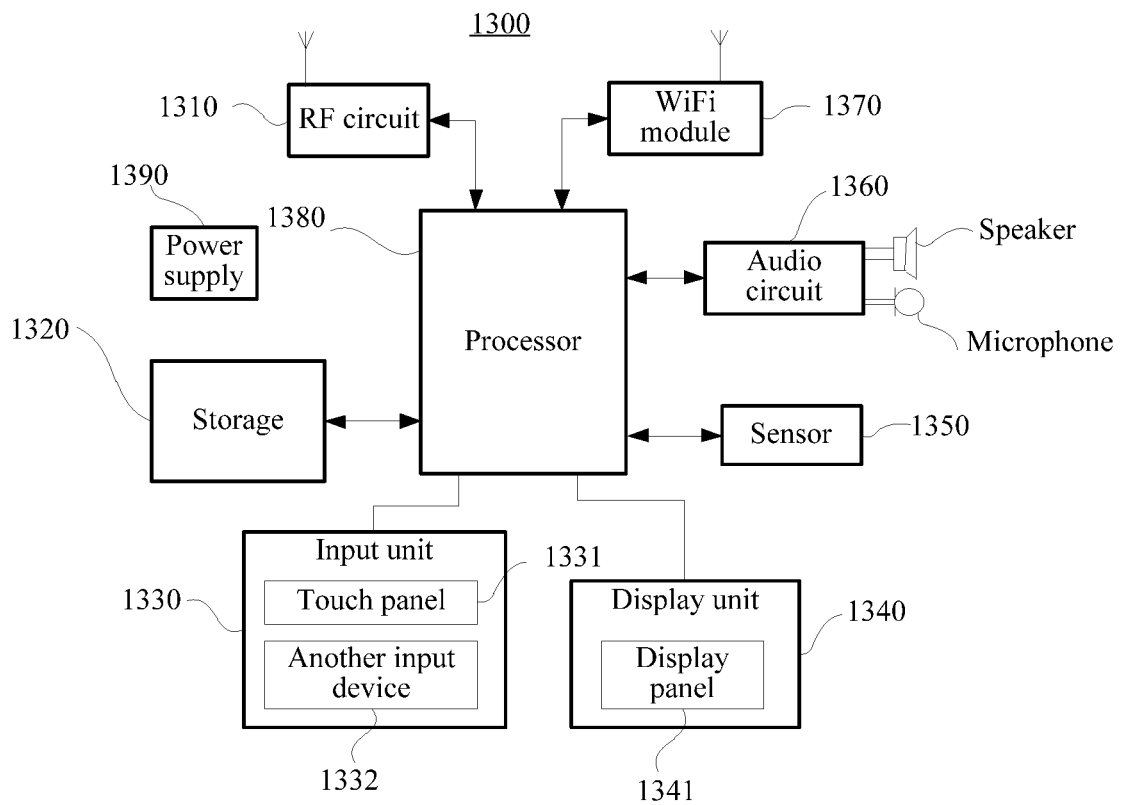
FIG. 13 is a schematic structural diagram of a terminal device in a wireless communications network according to another embodiment of the present invention.

FIG. 13 shows a structural block diagram of a part of a structure of a terminal device 1300 according to an embodiment of the present invention. Referring to FIG. 13, the terminal device 1300 includes components such as an RF (Radio Frequency, radio frequency) circuit 1310, a storage 1320, an input unit 1330, a display unit 1340, a sensor 1350, an audio circuit 1360, a WiFi (Wireless Fidelity, wireless fidelity) module 1370, a processor 1380, and a power supply 1390. It may be understood by a person skilled in the art that the structure of the terminal shown in FIG. 13 does not constitute a limitation to the terminal, and the terminal device may include more or fewer components than those shown in the figure, or some components may be combined, or a different component deployment may be used.

It can be understood that, the storage 1320 may be an internal memory of the terminal device 1300, or an internal memory and an external memory of the terminal device 1300. The storage 1320 includes an NVRAM nonvolatile memory, a DRAM dynamic random memory, an SRAM static random memory, a flash drive, and a hard disk, an optical disc, a USB disk, a floppy disk, a tape drive, or the like.

The input unit 1330 may be configured to receive input digit or character information, such as a Chinese character string or a letter string that is entered by a user, and generate a signal input related to user setting and function control of the terminal device 1300. Specifically, in embodiments of the present invention, the input unit 1330 may include a touch panel 1331. The touch panel 1331, which may also be referred to as a touchscreen, may collect a touch operation of a user on or near the touch panel (for example, an operation of a user on or near the touch panel 1331 by using any suitable object or accessory such as a finger or a stylus), and drive a corresponding connection apparatus according to a preset program. Optionally, the touch panel 1331 may include two parts: a touch detection apparatus and a touch controller. The touch detection apparatus detects a touch location of the user, detects a signal generated from the touch operation, and transfers the signal to the touch controller. The touch controller receives touch information from the touch detection apparatus, converts the touch information into touch point coordinates, and then sends the touch point coordinates to the processor 1380. Moreover, the touch controller can receive and execute a command sent from the processor 1380. In addition, the touch panel 1331 may be a resistive, a capacitive, an infrared, or a surface sound wave type touch panel. Besides the touch panel 1331, the input unit 1330 may further include another input device 1332. The another input device 1332 may include, but is not limited to, one or more of a physical keyboard, a function key (for example, a volume control key and a switch key), a track ball, a mouse, a joystick, or the like.

The terminal device 1300 may further include a display unit 1340. The display unit 1340 may be configured to display information input by the user or information provided to the user or various menu interfaces of the terminal device 1300. Specifically, the display unit 1340 may include a display panel 1341. Optionally, the display panel 1341 may be configured by using an LCD (Liquid Crystal Display, liquid crystal display), an OLED (Organic Light-Emitting Diode, organic light-emitting diode), or the like.

In this embodiment of the present invention, the touch panel 1331 covers the display panel 1341, to form a touch display screen. After the touch display screen detects the touch operation on or near the touch display screen, the touch display screen transfers the touch operation to the processor 1380 to determine a type of a touch event, and then the processor 1380 provides a corresponding visual output on the touch display screen according to the type of the touch event.

In this embodiment of the present invention, the touch display screen includes an application program display area and a common control display area. An arrangement manner of the application program display area and the common control display area is not limited, and may be an arrangement manner, such as up-and-down arrangement and left-and-right arrangement, in which the two display areas can be distinguished. The application program display area may be used to display an interface of an application program. Each interface may include an interface element such as an icon and/or a widget desktop control of at least one application program. Alternatively, the application program display area may be a blank interface that does not include any content. The common control display area is used to display a control that is used relatively frequently, for example, a setting button, an interface number, a scroll bar, or an application program icon such as a phone book icon.

The processor 1380 is a control center of the terminal device 1300, connects parts of the entire terminal device by using various interfaces and lines, and performs various functions of the terminal device 1300 and processes data by running or executing a software program and/or a module and data stored in the storage 1320, thereby performing overall monitoring on the terminal device 1300. Optionally, the processor 1380 may include one or more processing units.

In this embodiment of the present invention, the processor 1380 is specifically configured to determine a network standard that needs to be used the terminal device 1300. A transceiver such as the RF circuit 1310 or the WiFi module 1370 is configured to send a network standard configuration request message to an access point device, where the network standard configuration request message indicates the network standard that needs to be used by the terminal device. The transceiver such as the RF circuit 1310 or the WiFi module 1370 is configured to receive a network standard trigger message sent by the access point device. The processor 1380 is configured to determine, according to the network standard trigger message, the network standard configured by the access point device.

Optionally, the processor 1380 is specifically configured to determine a network standard obtained from the input unit 1330, as the network standard that needs to be used by the terminal device 1300.

Optionally, the processor 1380 is specifically configured to determine, according to at least one type of status information of status information stored in the storage 1320 or status information of a wireless communications network that is collected by the terminal device by using the RF circuit 1310 or the WiFi module 1370, as the network standard needed by the terminal device 1300.

The terminal device in this embodiment of the present invention sends information about the network standard that needs to be used to the access point device. The access point device determines whether a new network standard needs to be configured. Then, the terminal device receives a notification message sent by the access point device, and accesses the access point device according to the notification message, so that the terminal device can use a network standard satisfying its requirement, thereby improving resource utilization.

Figure 14:
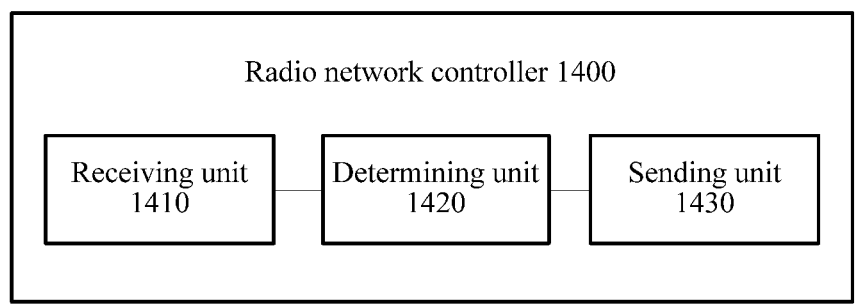
FIG. 14 is a schematic block diagram of a radio network controller in a wireless communications network according to an embodiment of the present invention.

FIG. 14 is a schematic block diagram of a radio network controller 1400 in a wireless communications network according to an embodiment of the present invention. The radio network controller 1400 shown in FIG. 14 includes a receiving unit 1410, a determining unit 1420, and a sending unit 1430.

The receiving unit 1410 is configured to receive a decision request message sent by an access point device, where the decision request message is used to indicate, a network standard that at least one terminal device accessing the access point device requests to use.

The determining unit 1420 is configured to determine, according to the decision request message, a same network standard that all or some of the at least one terminal device request to use, as a target network standard of the access point device.

The sending unit 1430 is configured to send a decision response message to the access point device, where the decision response message is used to indicate the target network standard.

The radio network controller in this embodiment of the present invention receives information about the network standard that needs to be used by the terminal device and information about the terminal device, where the information about the network standard and the information about the terminal device are sent by the access point device and received from the terminal device, and then determines, according to the information about the terminal device with reference to information about another access point device, whether the access point device needs to configure a new network standard, so that each terminal device can use a network standard satisfying its requirement, thereby improving resource utilization.

Optionally, the determining unit 1420 may be specifically configured to determine the target network standard according to the decision request message and information about the access point device controlled by the wireless communications network. In this case, the decision response message that is sent by the sending unit 1430 to the access point device is used to instruct the access point device to instruct another device among terminal devices accessing the access point device except the all or some of the at least one terminal device to access another access point device.

Optionally, the sending unit 1430 may be further configured to send a configuration file for configuring the target network standard to the access point device.

Figure 15:
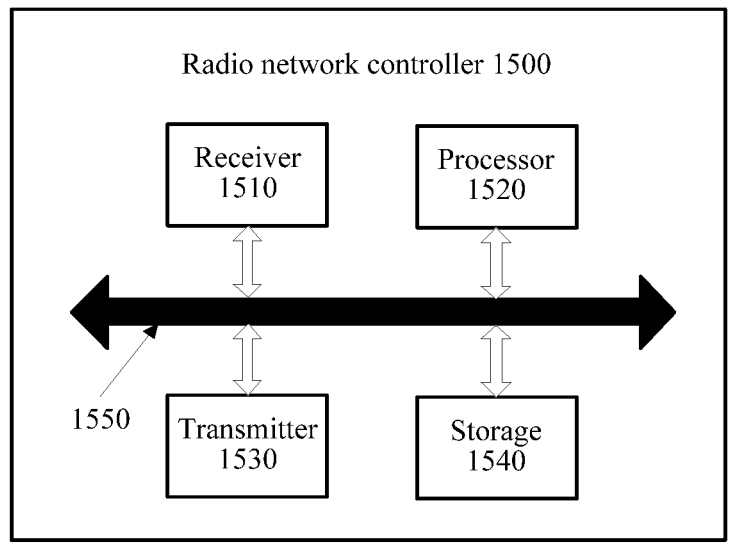
FIG. 15 is a schematic block diagram of a radio network controller in a wireless communications network according to another embodiment of the present invention.

FIG. 15 is a schematic block diagram of a radio network controller 1500 in a wireless communications network according to an embodiment of the present invention. The radio network controller shown in FIG. 15 includes a receiver 1510, a processor 1520, a transmitter 1530, a storage 1540, and a system bus 1550. The processor 1520, the storage 1540, the receiver 1510, and the transmitter 1530 are connected by using the bus system 1550. The storage 1540 is configured to store an instruction. The processor 1520 is configured to execute the instruction stored in the storage 1540, to control the receiver 1510 to receive a signal and control the transmitter 1530 to send a signal.

The radio network controller 1500 may correspond to the radio network controller in the methods for determining a network standard shown in FIG. 2 to FIG. 7, or may correspond to the radio network controller 1400 shown in FIG. 14. Specifically, the receiver 1510 corresponds to the receiving unit 1410 in the radio network controller 1400, the processor 1520 corresponds to the determining unit 1420 in the radio network controller 1400, and the transmitter 1530 corresponds to the sending unit 1430 in the radio network controller 1400. The foregoing and other operations and/or functions of the units of the radio network controller 1500 in this embodiment of the present invention are separately used to implement the corresponding procedures of the methods in FIG. 2 to FIG. 7.

It should be understood that, in a process in which the radio network controller 1500 implements the procedure of any one of the methods in FIG. 2 to FIG. 7, the processor 1520 is configured to execute the instruction stored in the storage 1540, to control the receiver 1510 to receive each message or packet that is received by the access point device in the corresponding method procedure, and control the transmitter 1530 to send each message or packet that is sent by the access point device in the corresponding method procedure. For brevity, details are not described herein again.

The radio network controller in this embodiment of the present invention receives information about the network standard that needs to be used by the terminal device and information about the terminal device, where the information about the network standard and the information about the terminal device are sent by the access point device and received from the terminal device, and then determines, according to the information about the terminal device with reference to information about another access point device, whether the access point device needs to configure a new network standard, so that each terminal device can use a network standard satisfying its requirement, thereby improving resource utilization.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for determining a network standard in a wireless communications network, comprising:
    receiving, by an access point device, network standard configuration request messages from a plurality of terminal devices, wherein each of the network standard configuration request messages indicates a network standard that needs to be configured on the access point device for use by a terminal device, wherein the access point device comprises a Wi-Fi access point, a home NodeB, an evolved node base station (eNB), or a Global System for Mobile Communications (GSM) base station;
    sending, by the access point device, a decision request message to a radio network controller that indicates to the radio network controller that the network standard needs to be configured on the access point device for use by at least some of the terminal devices;
    receiving, by the access point device, a decision response message from the radio network controller, wherein the decision response message indicates a target network standard, and wherein the target network standard is a network standard that is determined by the radio network controller according to the decision response message and information about the access point device controlled by the radio network controller;
    determining, by the access point device, the target network standard according to the decision response message;
    configuring, by the access point device, the target network standard according to a configuration file, wherein the configuration file is used to configure the target network standard; and
    sending, by the access point device, a network standard trigger message to the at least some of the terminal devices that indicates the target network standard is configured on the access point device for use by the at least some of the terminal devices.

2. The method of claim 1, wherein determining the target network standard further comprises determining, by the access point device, a same network standard that needs to be configured on the access point device for use by the at least some of the terminal devices as a target network standard according to the network standard configuration request messages when a proportion of the at least some of the terminal devices that use the same network standard divided by all the terminal devices accessing the access point device exceeds a first threshold.

3. The method according to claim 1, wherein determining the target network standard further comprises determining, by the access point device according to a network standard configuration request message from a first terminal device, a network standard that needs to be configured on the access point device for use by the first terminal device as the target network standard when a device priority of the first terminal device is highest among the terminal devices accessing the access point device.

4. The method of claim 1, further comprising sending, by the access point device, the network standard trigger message to another terminal device of the terminal devices except the at least some of the terminal devices that have been sent the network standard trigger message.

5. The method of claim 1, wherein configuring the target network standard according to the configuration file comprises:
sending, by the access point device, a configuration file request message to the radio network controller to request the configuration file that corresponds to the target network standard; and
receiving, by the access point device, the configuration file from the radio network controller according to the configuration file request message.

6. The method of claim 5, wherein the configuration file is stored locally on the access point device or on the radio network controller.

7. The method of claim 1, further comprising sending, by the access point device, the network standard trigger message to another terminal device according to the decision response message, wherein the network standard trigger message instructs the other terminal device to access another access point device.

8. The method of claim 1, further comprising:
establishing, by the access point device, a link to the terminal device using the target network standard; and
communicating, by the access point device, with the terminal device using the link.

9. A method for determining a network standard in a wireless communications network, comprising:
receiving, by a radio network controller, a decision request message from an access point device, wherein the decision request message indicates another network standard that is requested to be configured on the access point device for use by a first terminal device of a plurality of terminal devices that currently accesses the access point device;
determining, by the radio network controller according to the decision request message, a same network standard that at least some of the terminal devices request to be configured for use as a target network standard of the access point device, wherein the at least some of the terminal devices comprise the first terminal device and at least another terminal device of the plurality of terminal devices;
sending, by the radio network controller, a configuration file for configuring the target network standard to the access point device; and
sending, by the radio network controller, a decision response message to the access point device to permit the access point device to communicate a network trigger message to the at least some of the terminal devices that indicates the target network standard is configured on the access point device for use by the at least some of the terminal devices, and wherein the decision response message indicates the target network standard.

10. The method of claim 9, wherein determining the target network standard comprises:
determining, by the radio network controller according to the decision request message and information about the access point device, the same network standard that the at least some of the terminal devices request to be configured for use as the target network standard, wherein the access point device is controlled by the radio network controller; and
instructing, with the decision response message, the access point device to instruct another device of the terminal devices accessing the access point device except the first terminal device to access another access point device.

11. The method of claim 9, wherein the configuration file is stored locally on the access point device or on the radio network controller.

12. An access point device in a wireless communications network, comprising:
a receiver configured to:
receive network standard configuration request messages from a plurality of terminal devices, wherein each of the network standard configuration request messages indicates a network standard that needs to be configured on the access point device for use by a terminal device, wherein the access point device comprises a Wi-Fi access point, a home NodeB, an evolved node base station (eNB), or a Global System for Mobile Communications (GSM) base station;
receive, by a radio network controller, a decision request message that indicates to the radio network controller that the network standard needs to be configured on the access point device for use by the at least some of the terminal devices; and
receive a decision response message from the radio network controller, wherein the decision response message indicates a target network standard, wherein the target network standard is a network standard that is determined by the radio network controller according to the decision response message and information about the access point device controlled by the radio network controller;
a processor coupled to the receiver and configured to:
determine the target network standard according to the decision response message; and
configure the target network standard according to a configuration file; and
a transmitter coupled to the receiver and the processor and configured to send a network standard trigger message to the at least some of the terminal devices that indicates the target network standard is configured on the access point device for use by the at least some of the terminal devices.

13. The access point device of claim 12, wherein the processor is further configured to determine a same network standard that needs to be configured on the access point device for use by the at least some of the terminal devices as a target network standard according to the network standard configuration request messages when a proportion of the at least some of the terminal devices that use the same network standard divided by all the terminal devices accessing the access point device exceeds a first threshold.

14. The access point device of claim 12, wherein the processor is configured to determine, according to a network standard configuration request message from a first terminal device, a network standard that needs to be configured on the access point device for use by the first terminal device as the target network standard when a device priority of the first terminal device is highest among the terminal devices accessing the access point device.

15. The access point device of claim 12, wherein the transmitter is further configured to send the network standard trigger message to another terminal device of the terminal devices except the at least some of the terminal devices that have been sent the network standard trigger message.

16. The access point device of claim 12, wherein the transmitter is further configured to send a configuration file request message to the radio network controller to request the configuration file that corresponds to the target network standard, wherein the receiver is further configured to receive the configuration file from the radio network controller according to the configuration file request message for configuring the target network standard, and wherein the configuration file is stored locally on the access point device or on the radio network controller.

17. The access point device of claim 12, wherein the processor is further configured to:
  establish a link to the terminal device using the target network standard; and
  communicate with the terminal device using the link.

18. A radio network controller in a wireless communications network, comprising:
  a receiver configured to receive a decision request message from an access point device, wherein the decision request message indicates another network standard that is requested to be configured on the access point device for use by a first terminal device of a plurality of terminal devices that currently accesses the access point device;
  a processor coupled to the receiver and configured to determine, according to the decision request message, a same network standard that at least some of the terminal devices request to be configured for use as a target network standard of the access point device, wherein the at least some of the terminal devices comprise the first terminal device and at least another terminal device of the plurality of terminal devices, and to configure the target network standard according to a configuration file; and
  a transmitter coupled to the receiver and the processor and configured to send a decision response message to the access point device to permit the access point device to communicate a network trigger message to the at least some of the terminal devices that indicates a target network standard is configured on the access point device for use by the at least some of the terminal devices, and wherein the decision response message indicates the target network standard.

19. The radio network controller of claim 18, wherein the processor is configured to:
  determine, according to the decision request message and information about the access point device, the same network standard that the at least some of the terminal devices request to be configured for use as the target network standard, wherein the access point device is controlled by the radio network controller; and
  instruct, with the decision response message, the access point device to instruct another device of the terminal devices accessing the access point device except the first terminal device to access another access point device.

20. The radio network controller of claim 18, wherein the configuration file is stored locally on the access point device or on the radio network controller.

* * * * *